US010356197B2

(12) United States Patent
Somayazulu et al.

(10) Patent No.: US 10,356,197 B2
(45) Date of Patent: Jul. 16, 2019

(54) DATA MANAGEMENT IN AN INFORMATION-CENTRIC NETWORK

(71) Applicant: Intel Corporation, Santa Clara, CA (US)

(72) Inventors: Vallabhajosyula S. Somayazulu, Portland, OR (US); Eve M. Schooler, Portola Valley, CA (US); Hassnaa Moustafa, Portland, OR (US); Andrew Stephen Brown, Hillsboro, OR (US); Rath Vannithamby, Portland, OR (US); Srikathyayani Srikanteswara, Portland, OR (US); David John Zage, Fremont, CA (US); Ren Wang, Portland, OR (US); Christian Maciocco, Portland, OR (US); David E. Ott, Chandler, AZ (US); Jeffrey C. Sedayao, San Jose, CA (US); David E. Cohen, Hull, MA (US); Sung Lee, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 207 days.

(21) Appl. No.: 15/414,036

(22) Filed: Jan. 24, 2017

(65) Prior Publication Data
US 2018/0146058 A1    May 24, 2018

Related U.S. Application Data

(60) Provisional application No. 62/424,985, filed on Nov. 21, 2016.

(51) Int. Cl.
*H04L 29/08* (2006.01)
*H04L 12/26* (2006.01)
(Continued)

(52) U.S. Cl.
CPC ......... *H04L 67/2842* (2013.01); *G06F 16/23* (2019.01); *G06F 16/9574* (2019.01);
(Continued)

(58) Field of Classification Search
USPC ......................................................... 709/213
See application file for complete search history.

(56) References Cited

U.S. PATENT DOCUMENTS 7,162,433 B1 *  1/2007  Foroutan ........ G06Q 10/063114
                                                        705/12
2003/0191837 A1 * 10/2003  Chen ..................... H04L 41/142
                                                        709/224
(Continued)

FOREIGN PATENT DOCUMENTS

EP      2827556         1/2015
WO      2018093813      5/2018

OTHER PUBLICATIONS

"International Application Serial No. PCT/US2017/061670, Written Opinion dated Feb. 20, 2018", 8 pgs.
(Continued)

*Primary Examiner* — Jude Jean Gilles
(74) *Attorney, Agent, or Firm* — Schwegman Lundberg & Woessner, P.A.

(57) ABSTRACT

Generally discussed herein are systems, devices, and methods for managing content of an information centric network (ICN). A component of an ICN can include a memory including an extended content store that includes content from at least one other component of the ICN, and first attributes of the content, the first attributes including a content popularity value that indicates a number of requests for the content, and processing circuitry to increment the content popularity value in response to a transmission of a first content packet that includes the content, the first content
(Continued)

packet transmitted in response to receiving an interest packet.

25 Claims, 18 Drawing Sheets

(51) Int. Cl.
| | |
|---|---|
| *H04L 29/06* | (2006.01) |
| *G06F 16/23* | (2019.01) |
| *H04L 12/841* | (2013.01) |
| *H04L 12/773* | (2013.01) |
| *H04L 12/741* | (2013.01) |
| *H04L 12/813* | (2013.01) |
| *H04L 12/24* | (2006.01) |
| *H04L 29/12* | (2006.01) |
| *H04L 12/721* | (2013.01) |
| *H04L 12/911* | (2013.01) |
| *H04L 12/715* | (2013.01) |
| *G06F 16/957* | (2019.01) |
| *H04W 56/00* | (2009.01) |
| *H04W 4/02* | (2018.01) |
| *G06F 3/14* | (2006.01) |
| *G06F 3/0481* | (2013.01) |
| *G06F 3/0482* | (2013.01) |

(52) U.S. Cl.
CPC .......... *H04L 29/08* (2013.01); *H04L 41/5006* (2013.01); *H04L 41/5009* (2013.01); *H04L 41/5025* (2013.01); *H04L 41/5035* (2013.01); *H04L 43/12* (2013.01); *H04L 43/16* (2013.01); *H04L 45/04* (2013.01); *H04L 45/14* (2013.01); *H04L 45/60* (2013.01); *H04L 45/74* (2013.01); *H04L 47/20* (2013.01); *H04L 47/286* (2013.01); *H04L 47/783* (2013.01); *H04L 61/2076* (2013.01); *H04L 67/10* (2013.01); *H04L 67/1097* (2013.01); *H04L 67/12* (2013.01); *H04L 67/16* (2013.01); *H04L 67/2876* (2013.01); *H04L 67/327* (2013.01); *H04L 67/42* (2013.01); *H04L 69/22* (2013.01)

(56) References Cited

U.S. PATENT DOCUMENTS

| | | | |
|---|---|---|---|
| 2008/0162568 A1* | 7/2008 | Shen | G06Q 30/02 |
| 2009/0077599 A1* | 3/2009 | Appelquist | H04N 7/17318 |
| | | | 725/93 |
| 2013/0080243 A1* | 3/2013 | Dias | G06Q 30/02 |
| | | | 705/14.43 |
| 2013/0080249 A1* | 3/2013 | Dias | G06Q 30/02 |
| | | | 705/14.48 |
| 2013/0339481 A1 | 12/2013 | Hong et al. | |
| 2014/0185606 A1* | 7/2014 | Wei | H04L 67/2842 |
| | | | 370/350 |
| 2015/0039784 A1 | 2/2015 | Westphal | |
| 2015/0254249 A1 | 9/2015 | Mosko | |
| 2015/0319241 A1 | 11/2015 | Scott | |
| 2016/0212066 A1* | 7/2016 | Ravindran | H04L 47/80 |
| 2016/0313957 A1* | 10/2016 | Ebert | G06F 3/14 |

OTHER PUBLICATIONS

"International Application Serial No. PCT/US2017/061670, International Search Report dated Feb. 20, 2018", 3 pgs.

* cited by examiner

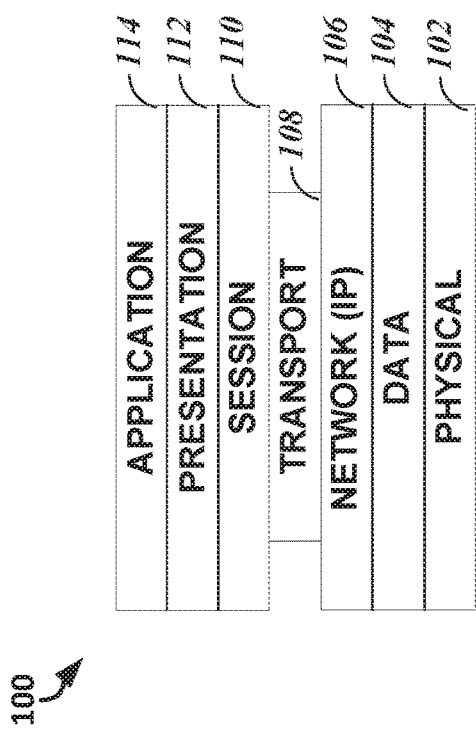
FIG. 1
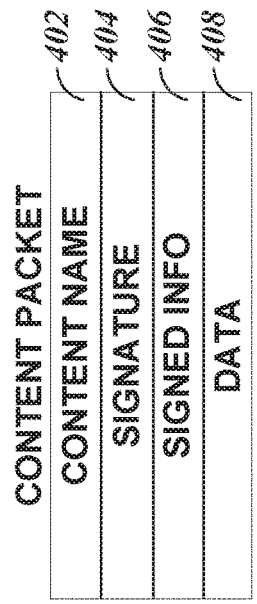
FIG. 2
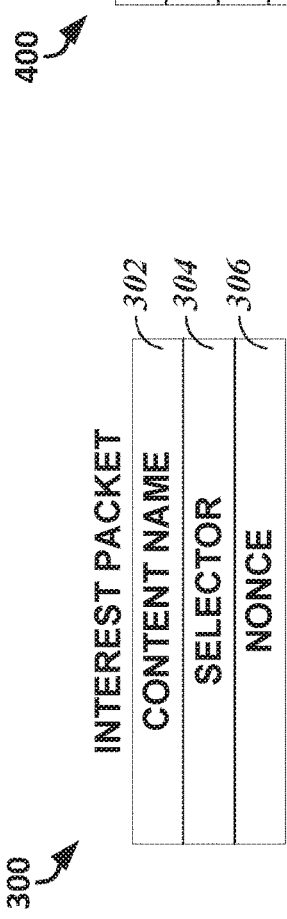
FIG. 3
FIG. 4

EXTENDED FIB TABLE

| NAME (802) | NEXT (804) | LINK LATENCY (806A) | TYPE OF LINK (806B) | QOS (806C) | ERROR (806D) | BANDWIDTH (806E) | LOCATION (806F) | FUNCTIONALITY (806G) |
|---|---|---|---|---|---|---|---|---|
| URL1 | DEVICE B UL | 3 | CELLULAR | 9 | 0.1% | HIGH | LOC. 1 | A |
| URL1 | DEVICE A UL | 2 | WIFI | 1 | 0.3% | LOW | LOC. 2 | B |
| URL1 | DEVICE B DL | 4 | ETHERNET | 7 | 0.2% | HIGH | LOC. 1 | A |
| URL1 | DEVICE A DL | 2 | WIFI | 2 | 0.3% | LOW | LOC. 2 | B |

FIG. 14

| NAME |
|---|
| /ORG1/DATA1/ENTITIES(*)/CHARACTERISTICS(*)/HARDWARE(*) |
| /ORG1/DATA2/LOCATION(*)/LINEAGE(*) |
| /ORG1/DATA1/ENTITIES(*)/HARDWARE(*) |
| /ORG1/DATA2/LINEAGE(*)/CHARACTERISTICS(*) |

DATA MANAGEMENT IN AN INFORMATION-CENTRIC NETWORK

REFERENCE TO RELATED APPLICATION

This application claims the benefit of priority to provisional patent application No. 62/424,985, filed on Nov. 21, 2016, which is incorporated by reference herein in its entirety.

TECHNICAL FIELD

Embodiments generally relate to network systems and, more particularly, to systems, devices, and methods for managing data (e.g., searching, naming, routing, and/or storing data) in an information-centric network (ICN).

TECHNICAL BACKGROUND

A network architecture may include node communication based on Internet Protocol (IP) addresses. This type of architecture is sometimes referred to as a host-oriented network (HON). A HON includes respective conversations between respective source and destination devices, one wishing to access to a resource and one providing access to the resource. IP packets thus identify a source and destination for each packet. A lot of internet traffic is conversations between sources and destination devices using Transmission Control Protocol (TCP).

This HON may not be a best match for some communications. Many internet communications relate to access to content. An information centric network (ICN) architecture may provide more reliable and/or efficient communication between devices compared to a HON. An ICN allows content to be named at a network layer, in contrast to using IP addresses in the HON.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 1 illustrates, by way of example, a logical block diagram of an embodiment of layers of a HON.

FIG. 2 illustrates, by way of example a logical block diagram of an embodiment of layers of an ICN.

FIG. 3 illustrates, by way of example, a logical block diagram of an embodiment of an interest packet.

FIG. 4 illustrates, by way of example, a logical block diagram of an embodiment of a content packet.

FIG. 14 illustrates, by way of example, a logical diagram of an embodiment of an extended FIB.

FIG. 18 illustrates, by way of example, a logical diagram of an embodiment of the name field.

DESCRIPTION OF EMBODIMENTS

Figure 5:
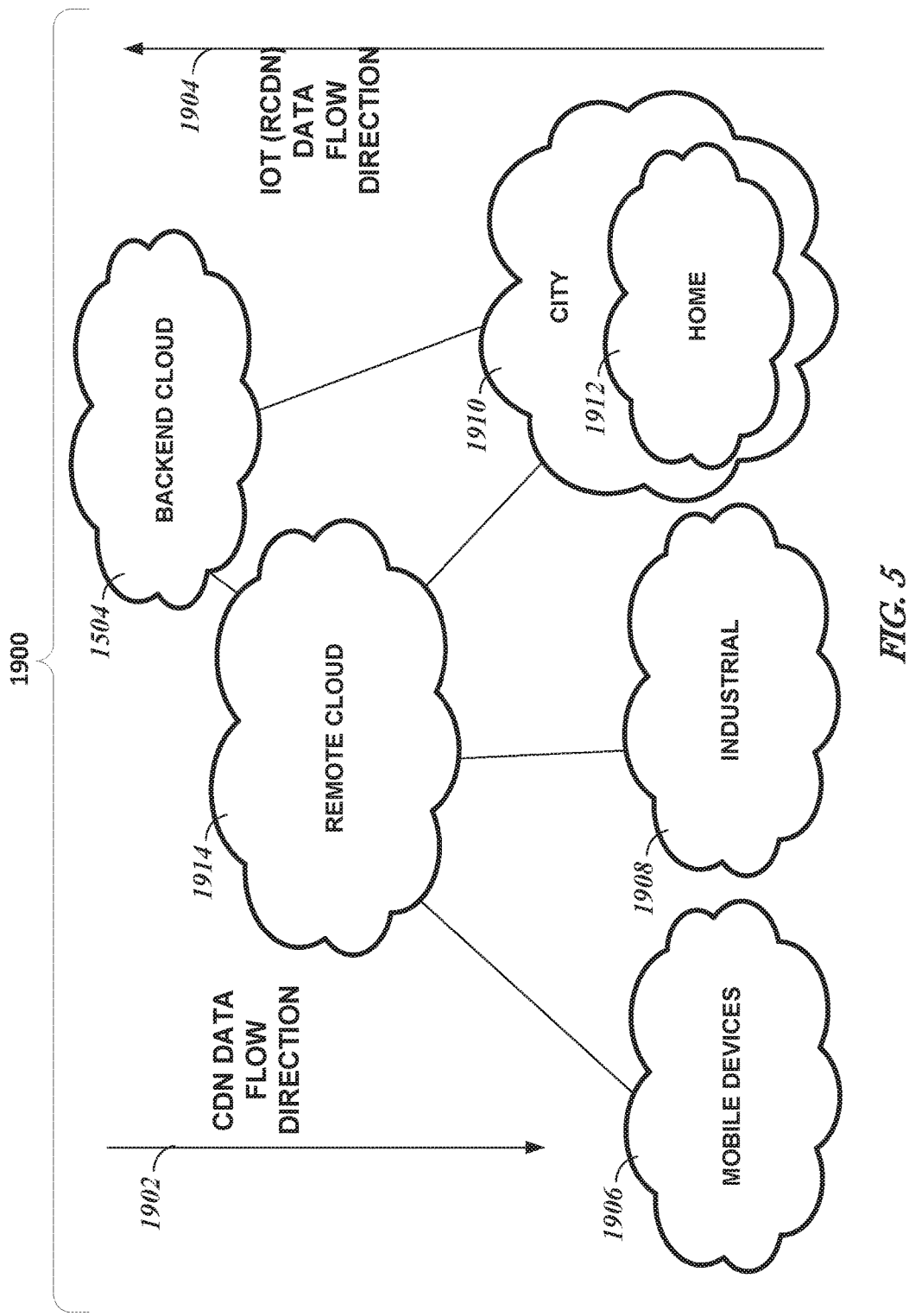
FIG. 5 illustrates, by way of example, a logical diagram of an embodiment of interconnected networks.

Examples in this disclosure relate to devices, systems, and methods that include managing data, such as in an ICN.

ICNs shift the paradigm from node endpoint-addressed routing of data to a routing based on content name. In an ICN, the name of the content is used to route data in response to interest requests. Since addressing is based on a content name (e.g., an interest attribute), the source from which data is served becomes secondary in an ICN. This allows for various optimization options, for example caching data natively in the network at "arbitrary" nodes of the system (e.g., any node capable of serving an interest packet). An interest packet may be served from the closest cache source that includes the content requested. The content in the cache may be moved there based on a content popularity count, a device's geo-location, a source least costly in terms of total access latency for devices that access the data, a bandwidth source, and/or a reliability of the cache device This sort of "in-network caching" may provide flexibility in what to cache and where, what content to migrate where and/or when, what to discard and/or when, or the like. Discussed herein are, among other things, data management, including data attribute management, techniques in ICN to allow for cost efficient and/or storage efficient caching. Such caching techniques may be helpful, especially given the huge amount of data generated by internet of things (IoT) devices, such as may be located at an edge of the network.

In contrast to a HON, in an ICN nodes communicate based on named content instead of IP addresses. In a HON a packet includes a header that defines a destination and includes a payload (data) to be transported to the destination. In ICN an interest, or content request message, is issued and a content object, or content return message, sometimes called a content packet, is returned. The content of the content packet may reside in and be retrieved from a distributed memory (e.g., distributed caches, memories, or other forms of storage).

Some basic differences between a HON and an ICN may include one or more of: (1) They use different name spaces. A HON uses IP address and an ICN uses content names. (2) An ICN includes a security feature directly at the narrow waist (layer four), such as may include a signed content packet, whereas no such security exists at layer four in the HON. (3) A HON sends packets to destination addresses, while an ICN uses Interest packets to fetch data packets. (4) A HON has a stateless data plane, while an ICN has a stateful data plane.

An ICN may include network devices, data (sometimes referred to as content), etc., which may have different storage capabilities and requirements. For example, a first device may have more internal storage than it needs to perform its operations, while a second device in the same network may be able to perform more reliably and/or efficiently with some more storage space available for access by the first device.

As previously discussed, a HON is different from an ICN. FIGS. 1-4 describe differences between the HON and the ICN and basic structures that are used in an ICN.

FIG. 1 illustrates, by way of example, a logical block diagram of an embodiment of HON layers 100. FIG. 2 illustrates, by way of example a logical block diagram of an embodiment of ICN layers 200. The typical open systems interconnect (OSI) model of the HON in FIG. 1 is broken into seven layers. The seven layers include a physical layer 102 (layer one), data link layer 104 (layer two), network layer 106 (layer three), transport layer 108 (layer four), session layer 110 (layer five), presentation layer 112 (layer six), and application layer 114 (layer seven).

In the seven layer model the physical layer 102 is referred to as layer one and the application layer 114 is layer seven with layers numbered in order therebetween. When an item is said to be in a lower layer, that means that the item is in a layer with a lower number than the layer being referenced. For example, a lower layer relative to the transport layer 108 (layer four) includes the network layer 106, data link layer 104, and/or the physical layer 102. A higher layer relative to the transport layer 108 (layer four) includes the session layer 110, the presentation layer 112, and/or the application layer 114. The ICN layers 200 as illustrated in FIG. 2 include a physical layer 202, a data link layer 204, a network layer 206, a transport layer 208, and an application layer 210.

In an ICN an interest packet (see FIG. 3) is issued by a user interested in obtaining content and a data packet including the requested content may be provided to fulfill the interest indicated (by content name) in the interest packet. FIG. 3 illustrates, by way of example, a logical block diagram of an embodiment of an interest packet 300. The interest packet 300 includes fields that allow a user to define the content requested in the interest packet 300. The fields, as illustrated, include a content name 302, a selector field 304, and a nonce field 306. A content object may be named, by a content publisher or user, such as by using a hierarchy of binary name segments.

A requested content (content identified by content name in an interest packet) need not be perfectly defined, in some embodiments. For example, a user may indicate a portion of the content name and use a "wildcard" indicator to identify that the content name is incomplete. In another example, the content name may be complete except for the extension (e.g., ".pdf", ".doc", ".mp3", or the like) and a wild card may be used in place of the extension. In such instances, the router may attempt to retrieve the highest quality format that is available and in a format compatible with the device that issued the interest packet. Attributes of the device are discussed elsewhere herein. The selector field 304 allows a user to specify a specific source for the content associated with the content name or otherwise be more specific with regard to a scope of data to be returned in response to receiving the interest packet 300. The nonce field 306 may be used to limit an amount of time the interest packet 300 persists before being discarded, ensure that the content is authentic (e.g., originates from a specified publisher, is a specified version, has not been tampered with or otherwise altered, or the like).

FIG. 4 illustrates, by way of example, a logical block diagram of an embodiment of a content packet 400. The content packet 400 may include fields that allow a user issuing a corresponding interest packet to verify the content is authentic, provide security for the content requested, and/or provide the requested content to the requester. The fields as illustrated include a content name field 402, a signature field 404, a signed information field 406, and data field 408 (e.g., the requested content, such as in an encrypted, compressed, unencrypted, and/or uncompressed format).

The content name field 402 may include the same data as the content name field 302. In some ICN configurations, a user does not need to define a complete content name, and in such instances the content name field 302 may be different from the content name field 402. The signature field 404 may include a cryptographic signature that binds the content name to a payload (the data field 408). The user that issued the interest packet 300 may access the data field 408 if the user has a key of the publisher, such as may be determined using data from the signature field 404 or the signed information field 406. In one or more embodiments, the data required to access the content may be provided in the interest packet 300, such as in the nonce field 306. The signed information field 406 may include an indication of how the content is compressed or encrypted or data indicating that the content in the data field 408 is authentic. The signed information field 406 may include an identification of the publisher, a location of a key that may be used to decrypt the data field 408 and/or verify the authenticity of the data field 408, an amount of time after which (or a specified time at which) the data becomes "stale" (e.g., no longer relevant or superseded by more accurate data), or the like.

In some embodiments, the ICN network routes the interest packet 300 and a pending interest table (PIT) of the interest packet 300 (not shown) is updated to record a path of the interest packet 300 through the network. After finding a content object that includes a name that sufficiently matches the name specified in the interest packet 300, the content object is routed back to the issuer, such as in the content packet 400, by reversing the path specified in the PIT (in current ICN routing techniques).

Embodiments herein may include an addition and/or a modification to how data is published to one or more memories of an ICN, such as may include a dedicated memory device and/or a memory of an internet of things (IoT) or other processing device (e.g., central processing unit (CPU) or graphics processing unit (GPU) or the like) of the network. In one or more embodiments, the data (sometimes referred to as content) in a memory (sometimes referred to as a content store) may be stored with attributes. The attributes may indicate a device from which the content originated, a service level agreement (SLA), a time span for the data to remain in the content store, whether the content is durable, a latency, a type indicating whether the device has wired and/or wireless communication capability, a type of content (e.g., whether the content is to be streamed or is static), or other attributes.

In contrast, current ICN content stores do not include such attributes. Such attributes may be used in determining whether the data may be moved to a different content store, such as without violating the SLA, for example. Such attributes may travel with the content, such as to retain attribute information that may be used for determining whether the content may be moved, removed from the content store, and/or otherwise altered (in terms of content and/or location).

An SLA is a contract that defines what a customer will receive from a service provider (either internal or external). The SLA defines the level of service expected from the service provider. An SLA is sometimes referred to as an SDA.

rCDN for the IoT

Networks of this section are agnostic as to network layers being configured in a HON, such as shown in FIG. 1, or an ICN, as shown in FIG. 2.

The Internet of Things (IoT) generates tremendous amounts of data. The data in a network that include IoT devices flows differently than data in standard content distribution networks (CDNs). Instead of flowing from a central location (e.g., a backend cloud) out to the network edges, IoT data is created at the edges (e.g., data sources are the sensors and/or other IoT devices). IoT data may be used by remote IoT applications and also in local networks. IoT data is processed in various ways, such as may include compression, removal, analytics, encoding/transcoding, and other transformations by edge nodes and/or Fog computing elements (i.e., nodes that replicate cloud functionality (e.g., compute, analytics, storage) more proximate to the data creation, such as at or near the edge of the network). IoT data may be cached and/or migrated dynamically, such as may be based on context, particularly as devices and local storage runs out of capacity. IoT data may be sent upstream and combined or aggregated with data from other IoT devices. The data may be archived or sent to further upstream elements or clouds.

Embodiments present a new approach called the reverse CDN, or rCDN for short. An rCDN may provide a content distribution infrastructure appropriate for IoT data. The rCDN differs from previous solutions in that it may consider and handle IoT data (without limitation to video or other type of multimedia), simplify IoT data management, and/or support the (natural) reverse flow of IoT data. An rCDN may provide for the transformation of larger sized data into smaller data chunks and distribution among edge nodes through in-flight in-network processing, real-time analytics, data compression, caching, and/or storage.

In embodiments, the rCDN framework handles the content distribution, aggregation and processing at the network edge. A routing layer (e.g., the transport layer 108 or 208) may understand the functional and non-functional criteria that inform the creation of the rCDN topology. A service layer above the routing layer may abstract operations (e.g., analytics, encoding/transcoding, compression, caching) that should be performed on the data as it flows upstream through rCDN collection nodes. Data flow in an rCDN framework is depicted in FIG. 5.

Standard CDNs are well suited for distributing content downstream from the cloud to the edge of the network, but they are not designed to handle highly dynamic (non-static, possibly mobile) data, variable data contents (e.g., vary from video content for surveillance to smart meter reading, and/or temperature, pressure, humidity, audio, optical, or other sensor reading), or the aggregation of upstream data flows. Also, CDNs are typically organized in a hierarchical configuration, which does not match the mesh-like behavior of many IoT networks.

"Reverse proxies" are devices typically used to hide servers from many clients to increase security or to increase performance. Reverse proxies are similar to CDNs in enabling content distribution from some central location downstream to the network edge. Bit torrent is another notable technology. Unlike most CDNs, bit torrent is designed to aggregate traffic from multiple caches that host small pieces of a particular piece of content (often video content). Still, bit torrent resembles a traditional CDN in that the content comes from some central location to be distributed to the network edge—the content gets cached in smaller pieces and reassembled when getting to edge clients.

Existing IoT networking solutions do not capture the natural flow of IoT data. Some existing solutions, such as Alljoyn® Sessionless Signals or Message Queuing Telemetry Transport (MQTT), concentrate on how to distribute data locally through pub/sub, broadcast, or multicast implementations. Other IoT solutions, such as those implemented with Amazon Web Services, from Amazon.com Inc. of Seattle, Wash., United States, simply rely on sending everything to a central cloud. No existing IoT networking solution deals with routing and aggregating data both locally and/or remotely, much less how to dynamically or statically route data through the system for processing and caching, such as at the same time. Also, IoT communication solutions exist for sharing original data (i.e., data replicas) among multiple local peers (e.g., Alljoyn Sessionless Signal, MQTT, or similar) but they are not well suited to handling multiple simultaneous reverse data flows. Embodiments provide a framework for IoT content distribution that not only distributes and caches data as would a traditional CDN, but also supports and enables the natural IoT data flow of multiple simultaneous source from multiple locations to a smaller collection of sinks.

FIG. 5 illustrates, by way of example, a logical diagram of an embodiment of interconnected networks 1900. FIG. 5 contrasts a traditional CDN data flow (indicated by arrow 1902) to a rCDN IoT data flow (indicated by arrow 1904), according to an embodiment. The interconnected networks 1900 as illustrated include mobile devices network 1906 (e.g., edge devices, such as may include smartphones, smart sensors (e.g., IoT devices), vehicles, or the like), industrial devices network 1908 (e.g., internet connected devices in a building or otherwise interconnected, such as for performing manufacturing), and a city network 1910 comprised of a plurality of home networks 1912, connected to a remote cloud 1914. The data of the rCDN may flow from the networks 1906, 1908, 1910, and/or 1912 to the remote cloud 1914, and then to the backend cloud 1504 (as indicated by the arrow 1904). The data of a CDN flows in the other direction (as indicated by the arrow 1902) from the backend cloud 1504, to the remote cloud 1914, and out to the end user in the networks 1906, 1908, 1910, and/or 1912.

Embodiments support data creation (e.g., "big data") and usage, such as at all levels of the network, from the edge back to the datacenter. Embodiments constitute a framework for IoT data handling for compute and storage at the edge.

Embodiments provide a framework for routing IoT data for migration, caching, aggregation, and transformation, such as through local and remote services. This data is not limited to a single content type as in traditional CDNs, but inclusive to a variety of IoT data (e.g., all IoT data) flowing in the network. Embodiments provide a dynamic data routing mechanism based on attributes, such as, but not limited to, available services at nodes (e.g., encoding/transcoding, analytics, data reduction, storage, caching), priority, network latency, storage availability, and device and service uptime.

Embodiments provide a service directory (e.g., a content store or service table (see FIG. 6), such as may be centralized or distributed) that catalogues the available services for acting on IoT data, which may be used to augment routing decisions. Embodiments provide an extensible service abstraction layer (e.g., implemented using an API, such as may be similar to one or more other APIs discussed herein) to process data flowing in the rCDN framework that simplifies IoT data routing, such as by abstracting routing complexity. Embodiments provide service policies directly associated with individual chunks of data (e.g., subsets of entire portions of content), which may be used to specify the sequence of services and attributes (e.g., metadata, platform capabilities like software guard extensions (SGX) required, or the like) for processing the data.

Figure 6:
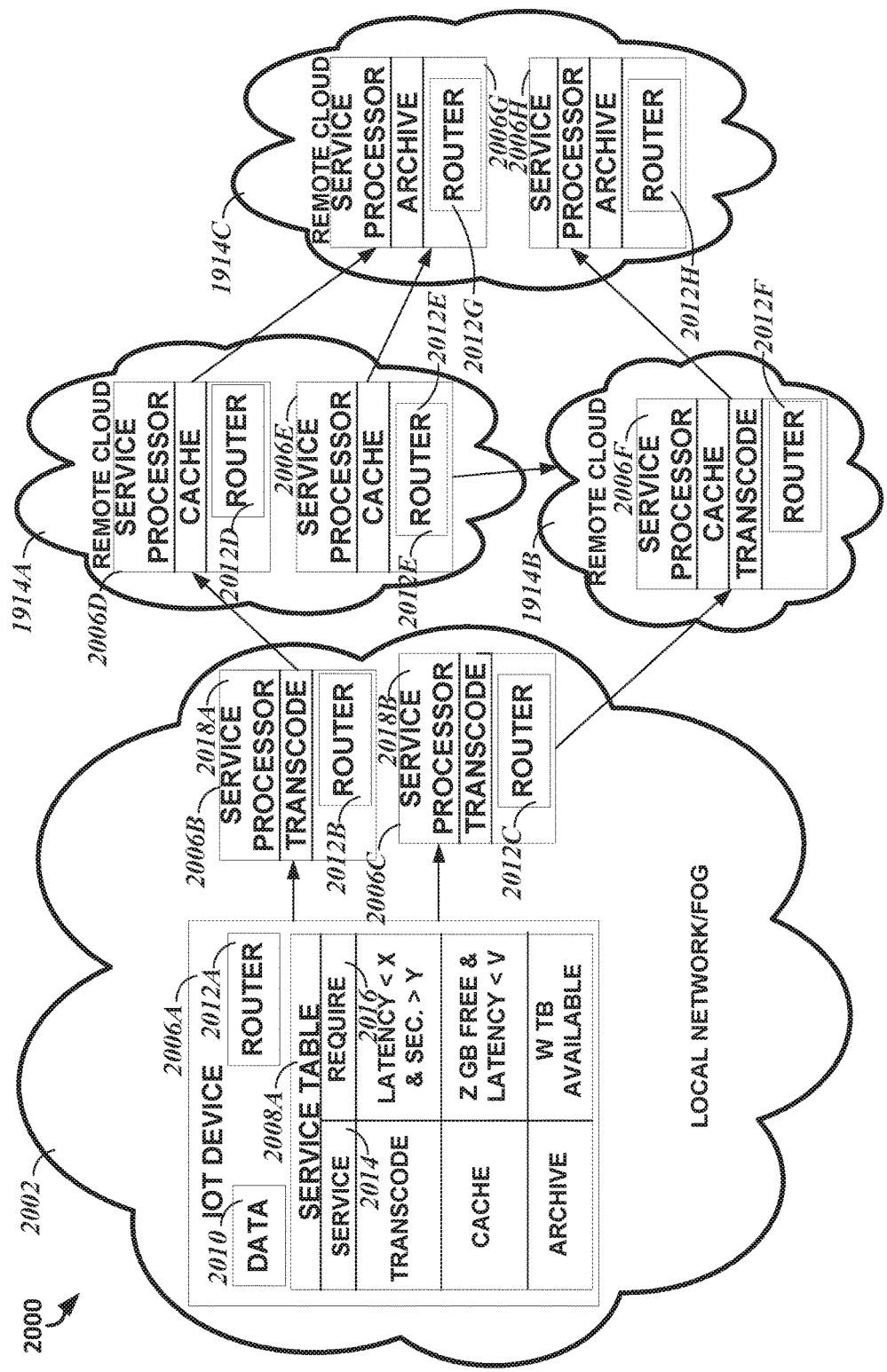
FIG. 6 illustrates, by way of example, a logical diagram of another embodiment of interconnected networks.

FIG. 6 illustrates, by way of example, a logical diagram of another embodiment of interconnected networks 2000. The networks 2002, 2004A, 2004B, and 2004C each illustrate one or more components of an rCDN framework according to one or more embodiments. The network 2002 is local network or a fog network and includes devices 2006A, 2006B, and 2006C. The networks 1914A, 1914B, and 1914C are remote clouds and include devices 2006D and 2006E, 2006F, and 2006G and 2006H, respectively.

The network 2002 includes an IoT device 2006A that generates data 2010 to be processed by services in a specific sequence. A service table 2008A lists services 2014 to be performed on data 2010. The table 2008A may be stored in a registry and not necessarily on the IoT device 2006A, as long as it is accessible by router 2012. The table 2008A includes requirements 2016 for a service processor 2018 that need to be met if service 2014 will be performed. The router 2012A, 2012B, 2012C, 2012D, 2012E, 2012F, 2012G, and 2012H may include hardware and/or software that determines which service processor 2018 will receive the data 2010 to be processed in accordance to service 2014 and requirements 2016. The devices 2006B-H will provide a given service 2014 for a block of data 2010.

The rCDN has at least two major blocks of functionality—a routing layer (e.g., including the routers 2012A-H and/or data 2010) and a service abstraction layer (e.g., the service table 2008A, other memory spaces that include an indication of services provided by a device, and/or the data 2010). By using an attribute-based routing layer, such as is discussed elsewhere herein, that optimizes path selection based on the attributes of the potential next hops, embodiments may utilize all potential information and improve the intelligence of the routing. The routing layer may combine multiple layers of information such as the available services at each node and the network latency to identify the next hop. As it is agnostic to the routing fabric, it provides improved flexibility and generalization over other solutions. The service abstraction layer takes the block of data 2010, and looks up the table 2008 that is associated with the services 2014 that define how and when the data 2010 is to be processed. That data may be passed to the routing layer, which finds the service processor 2018 that may help optimize the routing attributes (including any service requirements) for processing that next service on the list.

FIG. 6 illustrates how data may be processed across local and remote clouds. Using this example, the operation may include: data 2010 is generated in an IoT device 2006A. A table 2008A is examined by router 2012A to determine what services 2014 and the requirements 2016 for processing to be performed on data 2010. The IoT device 2006A finds one or more service processors 2018 that meets the requirements 2016 and then, based on system attributes, selects the best one to send the data 2010. This continues until all of the services 2014 in table 2008A are complete.

The rCDN framework of embodiments adapts to and is flexible with regards to routing techniques. If the underlying network stacks allow, routing may be done on a hop-by-hop basis or be done through a set of persistent or semi-persistent paths within and across clouds or other networks. In embodiments, data flows from a given service processor may go to multiple service processors or multiple data flows may converge at a single service processor. Both cases are illustrated in FIG. 6. Multiple remote networks may exist between the originating device and the final destination of the data, as seen in FIG. 6. Other data flows may pass between networks ("other possible data flows") before reaching their final destination cloud. Processing systems may have more than one service that they implement. For example, as shown in FIG. 6, one device 2006F may handle both transcoding and caching.

IoT Video Data Aggregation, Processing, and Retention in rCDN

Embodiments provide mechanisms for video caching, dynamic processing, and retention in the rCDN infrastructure for IoT introduced earlier herein. In traditional content distribution (e.g., video content streaming from content providers such as Netflix or Amazon), a Content Delivery Network (CDN) is deployed as a means of fetching popular content from content providers and caching closer to end users (content consumers) or prefetching, by anticipating content that is expected to be consumed by end users (e.g., videos of political events, most recent sport events) and caching closer to end users. Data flows from the content source (content provider) to the data consumer (end user) in a one-to many fashion through the CDN and the retention policy in this case follows known caching algorithms for data refresh/update (e.g., least recently used, less frequently used content, or the like).

In IoT, video content comes from downstream devices (IP cameras) to upstream devices (e.g., from edge nodes to the cloud, such as in the reverse direction of CDN) which changes the traditional CDN model in the sense that there are several content providers (IP cameras) providing real-time content streams and the end consumer is the Data Center Cloud or the Edge Cloud (in the case of applications using fog computing, see FIG. 6 for a fog computing system). Such a reverse flow of information is called an rCDN herein. In the rCDN, content flows from the content source, such as in in a many-to-one fashion. This requires the development of specific content aggregation and retention policies given the billions of connected IP sensors expected in the coming years and the huge amount of IoT video traffic they will generate. Methods and apparatuses in accordance with embodiments provide solutions for dynamic aggregation, processing, and retention of video in rCDN for IoT.

Embodiments may provide features and functionalities to provide one or more of: (i) dynamic content splicing from downstream nodes to upstream nodes (in the direction towards a backend cloud), (ii) dynamic & adaptive content transcoding to match IoT services needs and rCDN nodes capacity (e.g., memory capacity, compute capacity, or the like), (iii) content upstream distribution, (iv) dynamic content retention and expiration policies, such as to match IoT service needs, and/or (v) multiple caching realms creation for content.

Figure 7:
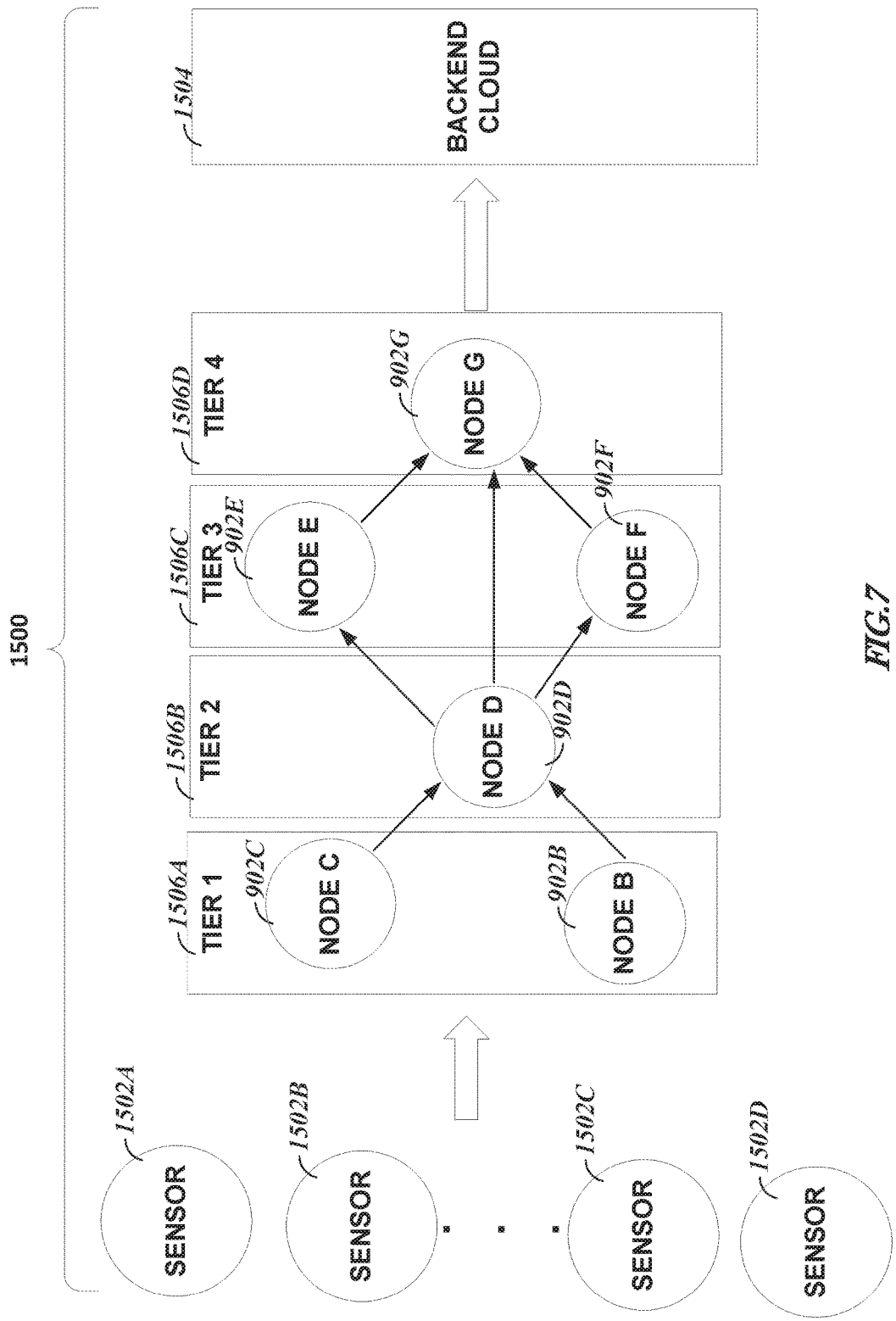
FIG. 7 illustrates, by way of example, a logical diagram of an embodiment of an rCDN system.

FIG. 7 illustrates, by way of example, a logical diagram of an embodiment of an rCDN system 1500. The arrows in FIG. 7 indicate a direction of IoT video traffic flow in the rCDN system 1500, according to an embodiment. In dynamic content splicing, each node 902B-C receives one or more content streams (e.g., video, audio, optical, or other sensor data streams) from one or more of a plurality of sensor devices 1502A, 1502B, 1502C, and/or 1502D, or downstream rCDN nodes, and splices them together. Such splicing may afford an opportunity to run (e.g., perform) content analytics to extract content subsets with useful information (e.g., regions of interest, such as license plates on vehicles, people/faces in the video) for improved splicing and content summarization. Such analytics may be performed by the processing circuitry 1604 (see FIG. 8).

In the illustrated nodes 902B-G, the nodes in a higher numbered tier 1506A, 1506B, 1506C, and/or 1506D are upstream from all other nodes in a lower numbered tier 1506A-D. For example, nodes in tiers 2-4 1506B-D are upstream from nodes in tier 1 1506A and nodes in tiers 1-2 1506A-B are downstream from nodes in tiers 3-4 1506C-D.

Figure 8:
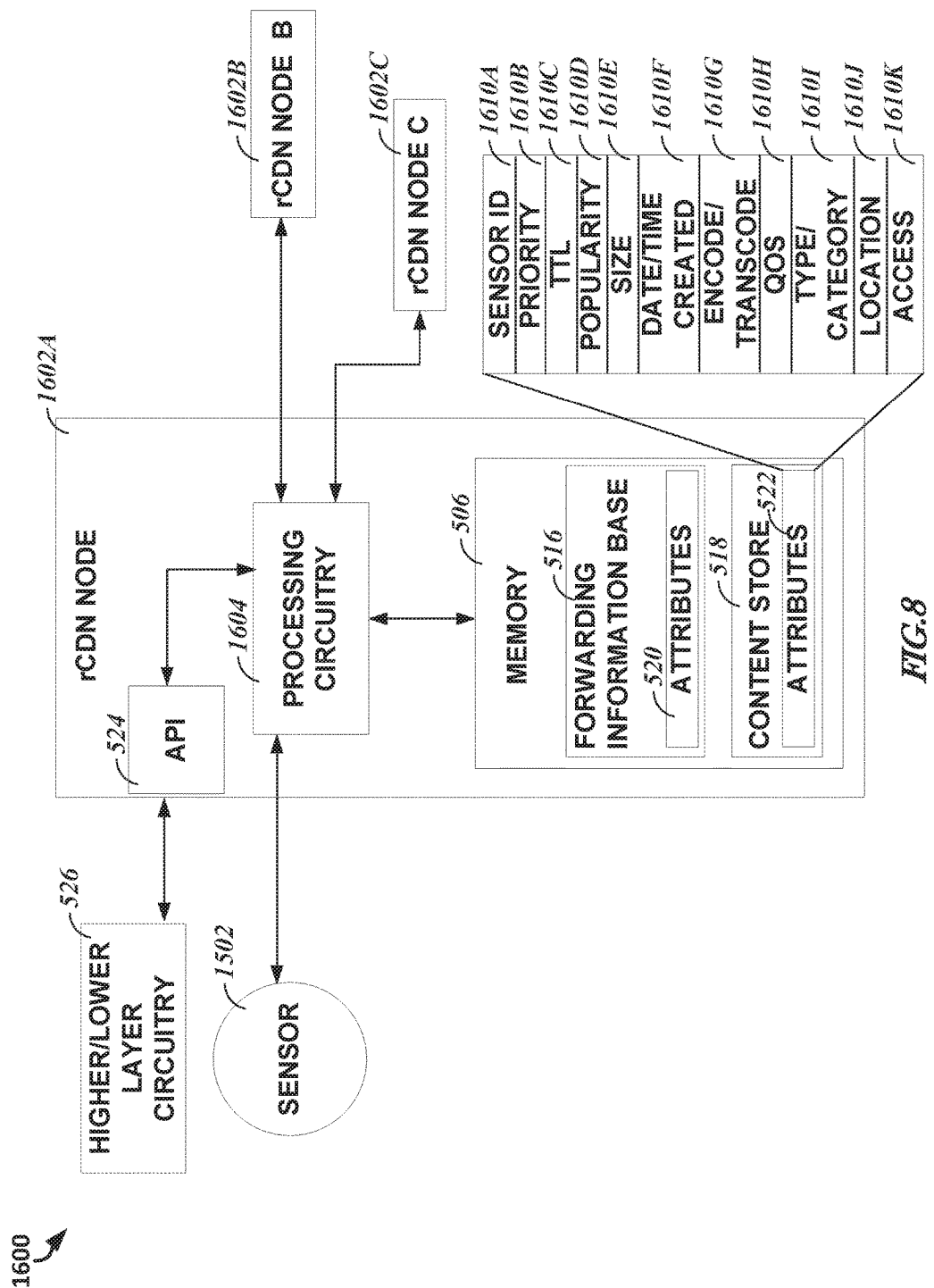
FIG. 8 illustrates, by way of example, a logical diagram of an embodiment of an rCDN system.

FIG. 8 illustrates, by way of example, a logical diagram of an embodiment of an rCDN system 1600. The system 1600 as illustrated includes the sensor providing content to the rCDN node 1602A. The rCDN node 1602A is illustrated in exploded view to illustrate components of the rCDN node 1602A. rCDN nodes 1602B-C may include similar or same components. The higher/lower layer circuitry 526C, the API 524C, and the memory 506 may be similar to, or the same as those previously discussed. The processing circuitry 1604 may perform operations for cache (e.g., memory 506) management, such as discussed with regard to FIGS. 7-10 and elsewhere herein. The processing circuitry 1604 may include electric or electronic components, such as may be similar to the components of the routing circuitry 504, such as can include a CPU or GPU. For purposes of explanation, it is assumed that the rCDN nodes 1602B-C are upstream from the rCDN node 1602A.

The attributes 522 of content in the content store 518 as illustrated include a sensor identification field 1610A, such as to identify (e.g., uniquely) the sensor device 1502A-D from which content originated, a retention priority field 1610B, such as to indicate a priority of retaining the data relative to other content in the content store 518, a TTL field 1610C, such as may be similar to the TTL field 712, a popularity field 1610D, such as may indicate how many users or devices request the content, a size field 1610E of the content (in terms of bits, bytes, or the like), a date/time field 1610F that indicates a date/time at which the content was created, such as may be used to help determine whether the TTL of the TTL field 1610C has expired, an encode/transcode field 1610G that may indicate whether the content is encoded and/or transcoded and what type of encoding and/or transcoding technique was used, a QoS requirement field 1610H of the content, a type/category field 1610I of the content, such as may be used in purging content from the content store 518 and/or determining whether to retain received content, a location field 1610J that indicates a geographic location of the sensor associated with the sensor ID of the sensor ID field 1610A, and an access field 1610K that indicates which devices, applications, users, and/or other entities that are permitted or denied access to the content.

In dynamic and adaptive data transformation (e.g., encoding, transcoding, compressing, subsampling, aggregating, or the like), such as to help match IoT services needs and/or the rCDN nodes 1602A-C capacity, service-aware and server-aware (ICDN server) content management mechanisms may be provided, such as through dynamic and adaptive content transcoding pre-caching (e.g., to match the available caching capacity) and post-caching (e.g., to manage the content workload being cached). Such data transformation may be performed by the processing circuitry 1604. In content distribution, the rCDN node 1602A (e.g., acting as temporary video content sources) may distribute content to other rCDN nodes 1602B-C (e.g., rCDN nodes upstream or downstream or on a same tier) in a push mode (to offload storage/caching based on load/capacity) or pull mode (based on a request from an upstream or downstream node or a node on a same tier).

In dynamic retention policies, such as to match IoT service needs, context-aware content retention handling system may include an rCDN node examining (e.g., periodically) the lifetime (e.g., the TTL in the TTL field 1610C) of each cached content item (e.g., video chunk), its size in the size field 1610E, and/or other associated metadata (e.g., other attribute(s) 522), and determine a retention priority for the priority field 1610B and/or policy (policy discussed elsewhere herein). In multiple caching realms creation, creation of multiple caching regions within each rCDN node 1602A-C, such as in the content store 518, are provided for caching data based on data category field 1610I and/or service category (e.g., the QoS field 1610H). This allows faster cache hits, parallel and multiple kinds of access by different IoT applications to the same rCDN node 1602A-C. Caching realms may be virtualized caches within each rCDN node 1602A-C that broker access control.

Current content management solutions for CDN considers traditional CDN infrastructure, where content is cached closer to end-users, sometimes called "content consumers" using specific known servers allocated for that purpose. Also, bitTorrent and WebTorrent technologies, among others, are currently used to share large amount of content in a peer-to-peer (P2P) assisted fashion. The features/capabilities presented in embodiments may help meet the dynamic nature of an rCDN and differs from the mentioned approaches at least as follows. Embodiments provide for dynamic processing of content traffic and on-demand functions of the caching capacity and content itself of "interesting/meaningful data." Caching may be type/category field 1610I dependent and multiple realms may exist within the same cache on each node for multiple categories of content.

Embodiments may provide dynamic content splicing, such as may be performed by the processing circuitry 1604. Each rCDN node 1602A, receiving content streams from one or more sensor devices 1502 (e.g., IP camera(s), audio, temperature, pressure, humidity, wind, optical, electromagnetic, other sensor, or other IoT device) or downstream rCDN node(s) 1602B-C, may run analytics, such as by using the processing circuitry 1604, such as to determine if a similar content was received. If a similar content is received, the received content, or the previously received content, may be dropped. The time stamp for the similar content may be updated in the cache (e.g., the TTL field 1610C may be reset or updated). The ICDN node may verify the location for the capture of the content stream, such as by using the location field 1610J.

Matching the named data in an ICN may follow several strategies. Generally, the data is named hierarchically, such as with a universal resource identifier (URI). For example, a video may be named www.somedomain.com/videos/v8675309. Here, the hierarchy may be seen as the publisher, "www.somedomain.com," a sub-category, "videos," and the canonical identification "v8675309." As an interest traverse an ICN, ICN equipment will generally attempt to match the name to a greatest degree. Thus, if an ICN device has a cached item or route for both "www.somedomain.com/videos" and "www.somedomain.com/videos/v8675309," the ICN device will match the latter for an interest packet specifying "www.somedomain.com/videos/v8675309." In an example, an expression may be used in matching by the ICN device. For example, the interest packet may specify "www.somedomain.com/videos/v8675*" where '*' is a wildcard. Thus, any cached item or route that includes the data other than the wildcard will be matched. In an example, additional meta-data may be attached to the interest packet, the cached data, or the route, to provide an additional level of matching. For example, the data name may be specified as "www.somedomain.com/videos/v8675309," but also include a version number. In this example, the interest packet may specify the name and also the version number, or version range, desired. The matching may then locate routes or cached data matching the name and then perform the additional comparison of meta-data or the like to arrive at an ultimate decision as to whether data or a route matches the interest packet for responding to the interest packet or forwarding the interest packet respectively. Similar content can be content that matches in one or more of the manners discussed.

If the content stream is from a new sensor or for an old sensor in a new location (new and old in terms of whether the sensor existed in the network previously), such as may be determined using the sensor ID field 1610A and/or the location field 1610J, then a new content chunk may be created in the cache, otherwise, the content may be spliced with cached content chunks that come from the same IP sensor/same location. In any case, the rCDN node 1602 may check the content (e.g., scenes in video) and extract data with useful information (e.g., motion, one or more objects, a lighting change, a color change, new edges, a change in a data value, or the like) and create a content summarization chunk, such as by using the processing circuitry 1604.

Embodiments provide dynamic and adaptive transcoding to match IoT services needs and ICDN nodes capacity mechanisms. Upon the reception of each content by an rCDN node 1602A-C, the rCDN node 1602A-C may examine the content size as well as the associated meta data to know the service requirements (e.g., real-time, mission critical, daily surveillance, monthly surveillance, QoS, or the like). If the received content is in raw format, the chunk may be encoded to a compressed format (e.g., from raw video to H.264 or other compressed format), and if the content comes in an encoded format, it may be transcoded to a more storage efficient format (e.g., from H.264 to H.265, or other compressed format). The encode/transcode field 1610G may be updated accordingly.

In one or more embodiments, if the size of the content chunk examined is less than the remaining cache space, the chunk may be cached regardless of the service requirements. Otherwise, an overall transcoding "sanity check" may be done by the rCDN node 1602A-C to decide on more optimization for the other cached content chunks (through encoding to more efficient codecs such as H.265, reducing the number of frames per second, or deleting the video frames or other data that do not bring new information). If the size of the content chunk examined and processed is still greater than the cache space following the cache overall transcoding sanity check, the cache retention policies process described later herein is checked to see if the cached content chunk(s) may be purged. If so, the new processed content chunk processed is cached, otherwise, the rCDN node transmits the content chunk to an upstream rCDN node and the same process may reiterate.

Embodiments provide content upstream distribution processes. Each rCDN node may obtain information from upstream rCDN nodes on upstream node locations, remaining caching space, and/or type of content chunks cached (e.g., real-time, mission critical, road traffic information), such as may be stored as attributes 520 in the FIB 516. A content type may help provide coherency in the content splicing/summarization process discussed earlier herein. If the cache capacity of the rCDN node 1602A-C is full or the rCDN node 1602A-C cannot otherwise accommodate a received content chunk, then that rCDN node 1602A-C sends the content chunk in a push mode to the upstream rCDN node (e.g., one that is geographically proximate or a next-neighbor rCDN node), and has a remaining caching space greater than the content chunk size, and/or that has cached content semantically close in type to the received content chunk. The downstream rCDN node 1602A may be queried by an upstream rCDN node 1602B-C on specific content chunk(s) of specific type (pull mode). If the downstream ICDN node 1602A does not have caching capacity shortage, then the downstream rCDN node 1602A may stream the required content chunk(s) to the requester, otherwise, the downstream rCDN node 1602A may stream the required content chunk(s) to the requestor and purge the content chunk(s) from its cache.

Embodiments provide dynamic content retention policies. Each rCDN node 1602A-C may examine the lifetime of each cached content chunk and if it reaches its validity time (indicated in the associated metadata, the TTL field 1610C, or some other manner) then the content chunk is considered expired and may be purged. Each rCDN node may examine the size of each cached content chunk and proceed as follows according to the below pseudocode:

---

(1) If [(content chunk size > size threshold) OR (content chunk size > the remaining cache capacity)] then go to (2) else do nothing (2) If [(content chunk expiration time is close or past)], the rCDN node purges the content chunk from its cache and go to (3)

(3) Else, the rCDN node examines its retention priority
    If [content chunk retention priority < priority threshold)], the rCDN node purges the content chunk from its cache,
    Else, the rCDN node offloads the content chunk to an upstream rCDN node with [(remaining capacity > content chunk size) AND (cached videos semantically close in type to the received content chunk)]

---

Pseudocode for dynamic video retention.

Each rCDN node 1602A-C may dynamically manage its retention policies through examining the retention priority of each cached content chunk and may update the retention priority as follows:

---

(1) If [(the content chunk has high retention priority) AND ((the content chunk was never requested) OR (is not frequently requested))], the rCDN node updates the content chunk retention priority to a lower priority (2) Else, If [(the content chunk has low retention priority) AND (the content chunk is frequently requested)], the rCDN node updates the content chunk retention priority to a higher priority Pseudocode for updating retention priority.

A high retention priority may include a retention priority greater than (or equal to) a retention threshold. A low retention priority may include a retention priority less than (or equal to) the retention threshold. Content requested infrequently may include content requested less than (or equal to) a request threshold number of times, such as may be determined by comparing the popularity count to the request threshold. Content requested frequently may include content requested greater than (or equal to) the request threshold number of times. The retention priority attribute 1610B is an example of the retention priority.

By increasing the request threshold, a node may tend to store less content and by lowering the request threshold, a node may tend to store more content. By increasing the retention threshold, a node may tend to store less content and by lowering the retention threshold, a node may tend to store more content.

Embodiments may provide for a process of creating multiple caching realms. Each rCDN node 1602A-C may receive information during deployment on the IoT service (e.g., clinic e-health service, Department of Transportation (DOT) traffic management system, utility company system, or the like). This information may include metadata on the type of content that each IoT service requires, which may allow the rCDN node to better organize its caching realms. Each rCDN node may create separate caching realms corresponding to the different types of content (e.g., video or other sensor data). Each caching realm may include content that are semantically sufficiently close (e.g., include content names that have greater than a threshold number of consecutive characters in common, such as may include or use expanding one or more names using a semantic matching technique). In one or more embodiments, each cache realm may include its own retention threshold and/or request threshold. Such caching realms may be independently refreshed based on content consumers update and interest (e.g., a popularity counter, such as discussed previously herein).

Each rCDN node 1602A-C may provide many-to-many access to the caching realms (e.g., each service consumer for content may access multiple caching realms and multiple service consumers for content may access the same caching realm). The access policy may be specified for each IoT service and/or each caching realm, such as may be based on the needs of the IoT service. There may be multiple access policies to the same caching realm for different services. Private caching realms are also considered, such as may limit access to a caching realm to one service that may be specified in the access field 714.

Figure 9:
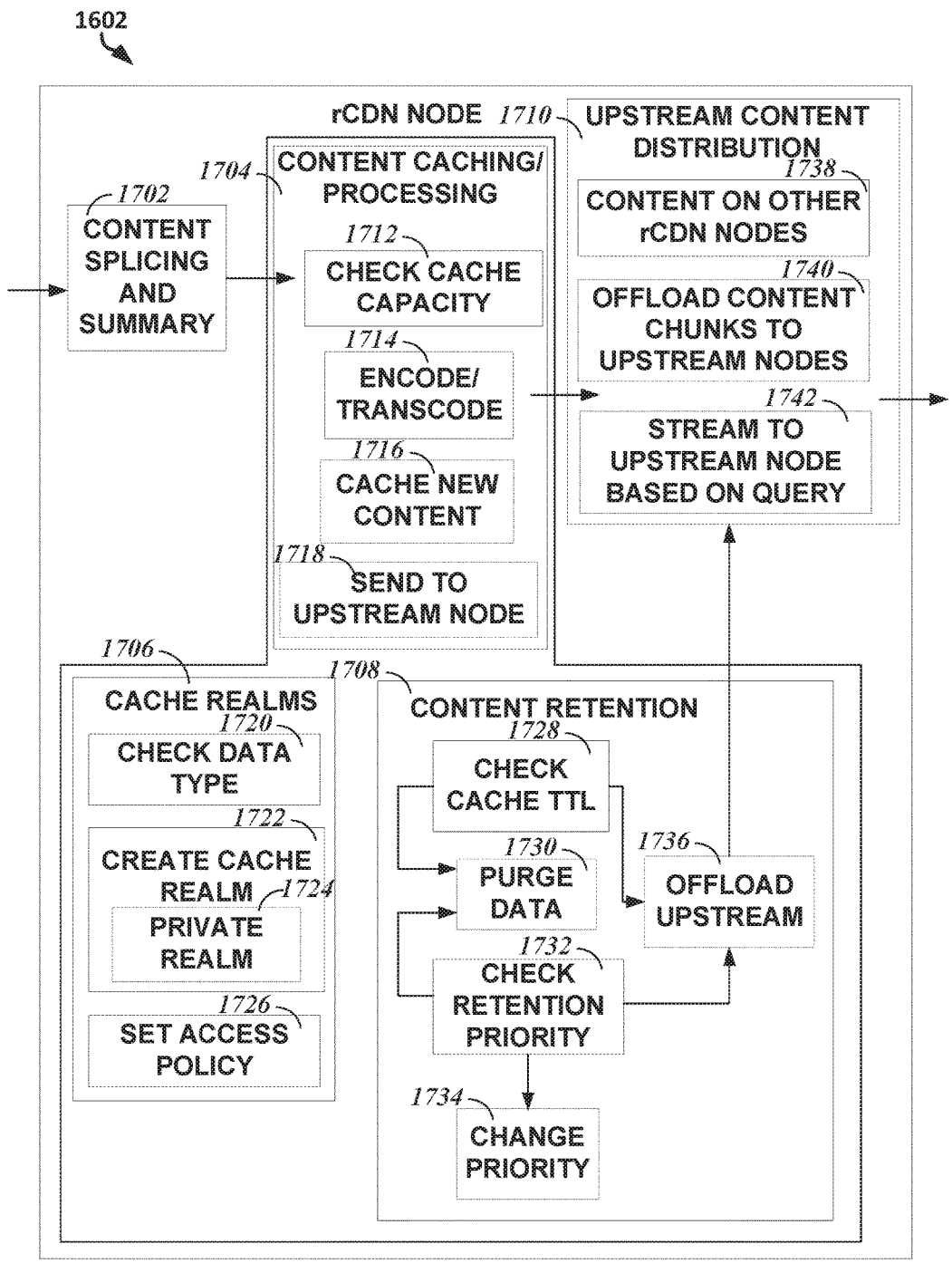
FIG. 9 illustrates, by way of example, a logical diagram of an embodiment of an rCDN node.

FIG. 9 illustrates, by way of example, a logical diagram of an embodiment of an rCDN node 1602. FIG. 8 illustrates some interaction between components (e.g., functions and features implemented by components) of the rCDN node 1602 according to one or more embodiments. FIG. 9 provides a view the features/functionalities described above showing their different states and interaction during the rCDN lifetime.

The rCDN node 1602 as illustrated includes content splicing and summary operations 1702, content caching/processing operations 1704, cache realms operations 1706, content retention operations 1708, and upstream content distribution operations 1710. The content splicing and summary operations 1702, may be performed by the processing circuitry 1604. The content splicing and summary operations 1702 may include determining portions of content that include unique data (as compared to the rest of the content). The portions that are determined to be unique may be spliced out and combined into a content summary chunk. The content summary chunk may be stored with the content in a cache. The summary may include the unique portions of the content, random portions of the content, and/or a specified section of the content (e.g., an abstract, a synopsis, a first and last paragraph, a first, middle, and last sentence or frame, or the like). A unique portion of content may include an image in a document, an object appearing in a video frame (such as may be determined using edge detection and processing), a unique set of frequencies in audio, a minimum or maximum value in sensor data, a threshold delta change in sensor data, or the like. The summary may then be compared to other summaries, such as to determine if the content is already present in the cache or not. Such as comparison may save computation resources as compared to comparing the content itself.

The content caching and processing operations 1704 may be performed, at least in part, by the processing circuitry 1604. The content caching and processing operations 1704 as illustrated include check cache capacity operations 1712, encoding/transcoding operations 1714, caching new content operations 1716, and sending content to upstream node operations 1718. The content caching and processing operations 1704 may include data aggregation, sub-sampling, compression, encryption, or other operations. The check cache capacity operations 1712 may include determining how much space is left in the cache (e.g., the memory 506 or more specifically, the content store 518). Encoding is changing information from an analog format to a digital format. Transcoding is changing digital information to another digital format. Both encoding and transcoding may result in compression of data (reducing the size of the data). The encoding/transcoding operations 1714 may include determining whether content was previously encoded/transcoded, what type of encoding/transcoding was performed, reversing the encoding/transcoding, and/or performing the encoding/transcoding. For example, analog data may be encoded if there is insufficient space to store the data in the cache, such as may be determined at operation 1714. In another example, digital data may be transcoded if there is insufficient space to the store the data in the cached. In yet another example, a device may request content in a specified format, while the content is stored is another format. The requested content may be encoded/transcoded to match the requested format.

The caching new content operations 1716 may include storing the content in the cache, such as if there is sufficient space and/or if the type/category of the content sufficiently matches the type/category stored in the cache. The sending to upstream node operations 1718 may include sending the content to another node closer to the backend cloud 1504 (e.g., in terms of hops or geographical location), such as may include sufficient space and/or store content of the type/category associated with the content.

Operations of the cache realms operations 1706 may be performed using the processing circuitry 1604, and/or a memory manager (such as may be implemented, at least in part using the processing circuitry 1604). The cache realms operations 1706 illustrated include checking a data type operation 1720, such as may be performed by reading the type/category attribute 1610I, creating a cache realm operations 1722, such as in response to determining there is sufficient space in the memory 506 and there is currently no realm to store data of the type/category associated with received content, and setting an access policy operation 1726, such as may be based on the priority 1610B, size 1610E, QoS 1610H, type/category 1610I, location 1610J and/or access 1610K. Creating the cache realm operations 1722 may include creating a private realm 1724. The private realm 1724 is a realm with narrow access permissions, such that only one or only a few applications, users, and/or devices may access the data in the private realm 1724.

Operations of the content retention operations 1708 may be performed using processing circuitry and/or a memory manager, such as can include a CPU or GPU. Operations of the content retention operations 1708 as illustrated include checking a cache TTL operation 1728, purging data operation 1730, checking retention priority operation 1732, changing priority operation 1734, and offloading content upstream operation 1736. The checking cache TTL operation 1728 may include comparing the TTL 1610C and the date/time created attribute 1610F with a current time, such as to determine whether the TTL has expired. If the TTL has expired, the data may be purged (removed from the cache), such as at operation 1730.

The checking retention priority operations 1732 may include comparing the priority 1610B to a retention threshold and purging the content in response to determining the priority 1610B is less than the retention threshold. The checking retention priority operations 1732 may include comparing the priority 1610B to all other priorities of content in the cache or realm and, in response to determining the priority 1610B is the lowest priority in the cache or realm, purging the data, such as at operation 1730. Checking the retention priority operations 1732 may include changing the priority operations 1734, such as based on the popularity 1610D. For example, if the priority 1610B is greater than the retention threshold and the popularity 1610D is less than a popularity threshold, the priority 1610B may be set to a lower value, such as by decrementing the value, such as at the changing priority operations 1734. In another example, if the priority 1610B is lower than the retention threshold and the popularity 1610D is greater than a popularity threshold, the priority 1610B may be increased, such as by incrementing the value, such as at the changing priority operations 1734. Offloading upstream operations 1736 may include forwarding content, an associated summary chunk, attributes or other meta data, or the like, to an upstream node. The operations 1736 may be performed in response to determining that the TTL has not expired, at operations 1728, and/or determining the content has sufficient retention priority, such as at operations 1732.

The upstream content distribution operations may be performed by the processing circuitry 1604. The upstream content distribution operations 1710 as illustrated include determining if their space on one or more upstream nodes at operation 1738, offloading content chunks to upstream nodes at operation 1740, and streaming content to upstream nodes based on a query at operation 1742. The operation 1738 may include querying another node, such as by issuing an interest packet or broadcasting a message rCDN nodes within wireless communication range. The response from the rCDN node(s) may include an indication of how much space is available and/or a type/category of content that is stored on the cache.

The operation 1740 may be performed in response to determining (1) there is insufficient space to store the content on the local cache, (2) data is too important in terms of priority to purge and replace with the received content, and/or (3) there is sufficient space to store the content on an upstream cache. The operation 1742 may include providing content to an upstream in response to a request for the content. The downstream rCDN node may, in one or more embodiments, purge the content from its local cache in response to providing the content to the upstream node.

Figure 10:
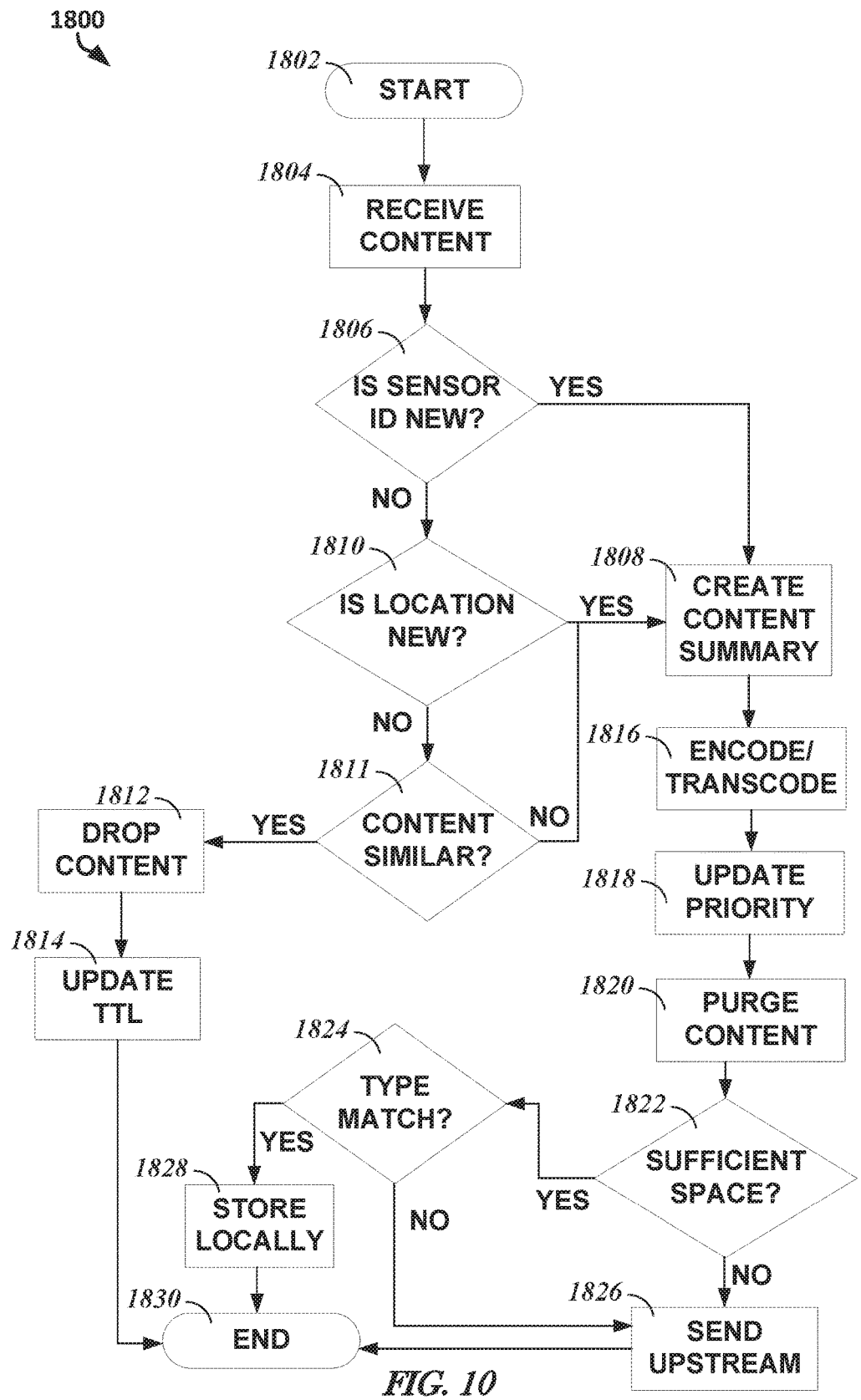
FIG. 10 illustrates, by way of example, a logical diagram of an embodiment of a method for content management, such as may be performed by the processing circuitry.

FIG. 10 illustrates, by way of example, a flow chart of an embodiment of a method 1800 for content management, such as may be performed by the processing circuitry 1604. The method 1800 as illustrated includes: beginning, at operation 1802; receiving content, at operation 1804; determining if a sensor ID associated with the received content is new, at operation 1806; in response to determining the sensor ID is new (relative to the cache) at operation 1806, a content summary may be created, at operation 1808; in response to determining the sensor ID is not new (relative to the cache) at operation 1806, it may be determined if a location of the sensor associated with the received content is new, at operation 1810; in response to determining the location is new, a content summary may be created, at operation 1810; in response to determining the location of the sensor associated with the received content is not new, it may be determined if the received content is similar to other content in the cache, at operation 1811; in response to determining the received content is similar to content in the cache at operation 1811, the received content or similar content may be dropped, operation 1812, and a TTL of content in the cache may be updated, at operation 1814; in response to determining the received content is not similar to content in the cache, the received content may be encoded/transcoded, at operation 1816, a priority of the received content and/or content in the cache may be updated, at operation 1818, and/or content may be purged from the cache, at operation 1820; it may be determined if the cache has sufficient open space to store the encoded, transcoded, and/or raw received content, at operation 1822; in response to determining there is sufficient space, at operation 1822, it may be determined whether the content matches a type/category of content that may be stored on the cache 1824; in response to determining there is insufficient space, at operation 1822, or in response to determining the type/category of the received content does not match the type/category of content that may be stored on the cache, the content may be sent upstream for storage, at operation 1826; in response to determining the type/category of the received content does match the type/category of content that may be stored on the cache, the transcoded, encoded, and/or raw content may be stored locally, at operation 1828; the method 1800 may end at operation 1830.

Some of the operations of the method 1800 are described with regard to the rCDN of FIG. 9. The received content, at operation 1804, may include video data or other content from a sensor of an rCDN. Performing the operation 1806, may include comparing a sensor ID provided with the received content at operation 1804 to sensor ID attributes associated with content in the cache. Creating the content summary may include one or more operations discussed with regard to the operations 1702. Encoding/transcoding at operation 1816 may include one or more operations discussed with regard to the operations 1714. Updating the priority at operation 1818 may include one or more operations discussed with regard to the operations 1734. Purging content may include one or more operations discussed with regard to the operations 1728, 1730, and/or 1732. Sending the received, transcoded, and/or encoded content upstream at operation 1826 may include one or more operations discussed with regard to 1738 and/or 1740.

The method 1800 illustrates just a single order in which the operations may occur and the operations may be performed in a different order than that shown. For example, the operation 1824 may be performed before the operation 1822; the operation 1811 may be performed before or after the operations 1806 and/or 1810; the operation 1820 may be performed before or after the operations 1816 and/or 1818; and/or the operation 1818 may be performed before or after the operations 1820 and/or 1816.

Methods for Smart Naming, Routing, and Caching

Smart (Approximate) Naming and Search

One use case for ICN may include a user search for content or data, such as may include using a wild card search (e.g., a search that may be fulfilled by responding with one of a plurality of content items). Embodiments may enable a more efficient search in cases where the subscriber may only need or want "approximate" data. For example, embodiments may provide the ability for subscribers (e.g., users that issue interest packets) to efficiently be served with data when multiple choices of data to fulfill a request are available, such as in possibly somewhat different forms, or different quality levels, or the like, or when the data is available in multiple caches, from multiple publishers, and/or in multiple formats.

This diversity of choice is even more pronounced in the Internet of Things (IoT), with the creation of large amounts of data, such as, video data. For example, when a subscriber requests a particular segment of video content, the user might set a range or "band" of acceptable quality/bitrate in their request. Publishers may wish to select the best content for serving that particular subscriber based upon a set of policies. Embodiments may provide this ability based upon, for example, policies at the subscriber or in the network itself.

In order to address these concerns, embodiments may provide a naming convention for information that includes attributes of the information as part of the name of the data itself. The names may be organized in one or more hierarchical content stores or databases that are stored at content provider (CP) nodes, regional surrogates of the CP nodes, or any other database remote or local to the CP nodes or surrogates thereof.

A subscriber who is requesting information that matches certain attributes may use specific names/values for those attributes, and wildcards for other attributes. For example, for information organized as:

< . . . ><locationcity>
   <locationsubdivision>
      <locationbuilding>
         <locationroom>
            <sensortype>< . . . >
a subscriber may request
< . . . ><City1>
   <Subdivision1>
      <JF2* temp>< . . . >, such as to obtain information from any temperature sensor in building "JF2".

In embodiments, publishers with content that matches content addresses/names in all the specified attributes and/or that have any content matching the <locationroom> attribute may respond to this request. In addition to the naming rules, routing of information may be modified by policies (e.g., access control policies) implemented at ICN routers to select from the multiple publishers' information based upon network layer (or other) attributes.

A variation on the above "wildcarding" may be to specify bands or ranges of values for attributes in the request. Thus, a subscriber accessing a hierarchy as described above may request < . . . ><City1><Subdivision1><JF2[room_min, room_max]><temp>< . . . > so that a content provider (CP) node may respond with information that matches temperature sensor data from a range of rooms (ranging from rooms with numbers from room_min to room_max). Alternatively, the values may also be mentioned using mathematical symbols, such as greater than (">"), less than ("<"), equal to ("="), a combination thereof, or the like. For example, a subscriber interested in all videos with greater than a certain quality may use a greater than symbol while specifying a minimum quality. As another example, a subscriber may access videos at less than a given bitrate using a less than symbol and a value for a maximum bitrate based on link capabilities of a device of the subscriber.

In one or more embodiments, a correlation score between a name of an interest packet and a name of content in a content store (CS) can be determined. The correlation score can be determined based on the content of the name fields of the interest packet and content packet, one or more attributes of the interest packet and content packet, and/or the like. The correlation score can be compared to a correlation threshold. In response to determining the correlation score is greater than (or equal to) the threshold, the content in the CS can be provided to fulfill the interest packet. If no content on the CS provides a correlation score greater than the threshold, the interest packet can be forwarded to a next CS.

Figure 11:
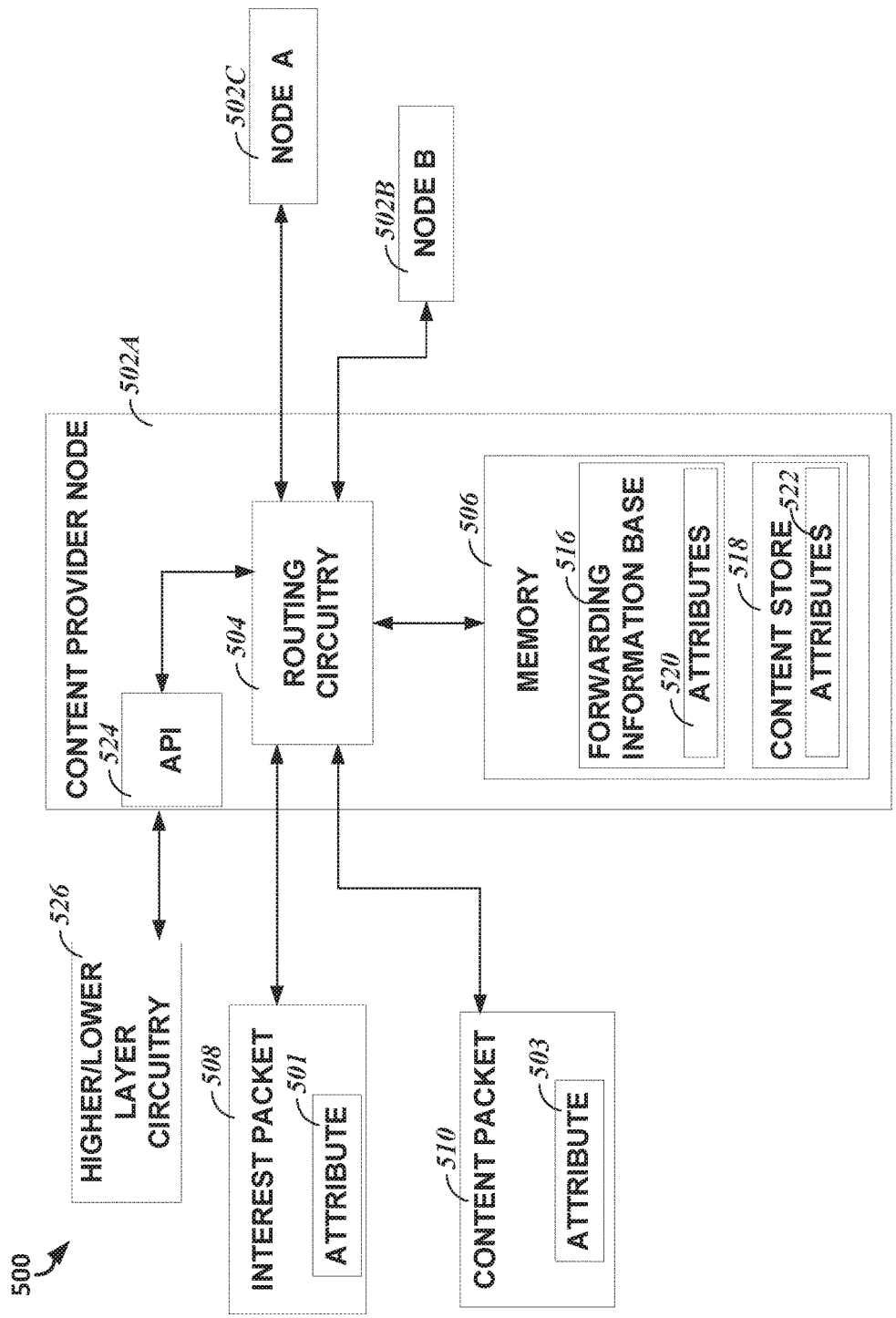
FIG. 11 illustrates, by way of example, a logical block diagram of an embodiment of a system that may respond to one or more interest packets.

FIG. 11 illustrates, by way of example, a logical block diagram of an embodiment of a system 500 that may respond to one or more interest packets 508. The interest packet 508 may include a request for content, such that one of multiple items of content fulfill the request (a "wildcard" request). The content name field 302 and/or an attribute field 501 may be used to help define the content that fulfills the interest packet 508. The system 500 as illustrated includes a plurality of content provider (CP) nodes 502A, 502B, and 502C. The CP node 502A is shown in an exploded view to illustrate components of the CP node 502A. Any of the other CP nodes 502B-C may include similar components, such as to perform similar or the same operations. The CP node 502A receives an interest packet 508 and determines how to respond to the interest packet, such as may be determined by the routing circuitry 504. The CP node 502A receives a content packet 510 and may record attribute data provided in the attribute field 503 in the memory 506.

The routing circuitry 504 may include electric or electronic components, such as may include one or more transistors, resistors, capacitors, inductors, diodes, regulators (e.g., current, voltage, and/or power regulators), multiplexers, logic gates, switches, buffers, amplifiers, oscillators, modulators, demodulators, interconnects (e.g., wired or wireless signal transfer mechanisms), antennas, radios (receive and/or transmit radios), or the like. The routing circuitry 504 may include an application specific integrated circuit (ASIC), a programmable gate array (e.g., a programmable chip, such as may include a field programmable gate array (FPGA)), a CPU, GPU, or the like. The routing circuitry 504 may be configured as a state machine configured to receive one or more attributes of the nodes 502B-C as inputs and produce a result indicating how to respond to the packet (e.g., what content to provide to fulfill the packet or which CP node 502B-C to which the packet 508 or 510 is to be routed).

The CP node 502A, as illustrated, further includes a memory 506 that includes content 518 and a forwarding information base (FIB) 516, such as may include an extended FIB. Examples of extended FIBs are discussed elsewhere herein. The content 518 may include content that may be requested by a user, such as by issuing an interest packet 508.

The FIB 516 includes data that may be used as input to the routing circuitry 504. The FIB 516 may include attributes 520 of one or more nodes, such as child nodes, neighboring routers (e.g., routers only one hop away from the CP node 502A), neighboring CP nodes, and/or other nodes, such as the node 502A. The attributes 520 in the FIB 516 may include attributes of the nodes 502A-C, discussed elsewhere herein.

The interest packet 508 may be an extended interest packet, such as may include an attribute field 501. Examples of such packets are shown in other FIGS. and discussed elsewhere herein. The attribute field 501 may be used to communicate one or more platform, content, and/or application attributes to a CP node that receives the interest packet 508. The routing circuitry 504 may read the attributes field 501, store attribute data provided in the attribute field, and/or route the interest packet 508 based on attributes in the interest packet 508, the FIB 516, the content 514, or other attributes that may be stored in the memory 506.

The content packet 510 may be an extended content packet, such as may include an attribute field 503. Examples of such packets are shown in other FIGS. and discussed elsewhere herein. The attribute field 503 may be used to communicate one or more platform, network, and/or content attributes to a node that receives the content packet 510. The routing circuitry 504 may read the attributes field, store attribute data provided in the attribute field (as desired) in the memory 506, and route the interest packet 508 based on attributes in the content packet 510, the FIB 516, the content store 518, or other attributes, such as may be stored in the memory 506.

The higher/lower layer circuitry 526, in one or more embodiments, may include electric or electronic components, such as may include components similar to that discussed with regard to the routing circuitry 504. The higher/lower layer circuitry 526 may monitor performance of packet transit in the network layer 206. The performance may be recorded as one or more attributes that may be provided to the CP node, such as may be stored in the memory 506. The attributes may include a QoS, a link latency, a type of connectivity interface available at a node, different attributes for UL and DL using the interface, or other network attributes as discussed herein. Device attributes, such as a location of the device that issued an interest packet, may be determined at a physical layer 202 and provided to the network layer 206, such as by communicating the location through layers between the physical layer 202 and the network layer 206, such as by using the higher/lower layer circuitry 526.

An application programming interface (API) 524 provides an interface through which the higher/lower layer circuitry 526 may communicate with the CP node 502A and vice versa. The API 524 provides a layer of abstraction such that the CP node 502A does not need to know proper formats for data provided to the higher/lower layer circuitry 526 and vice versa.

Figures 12, 13:
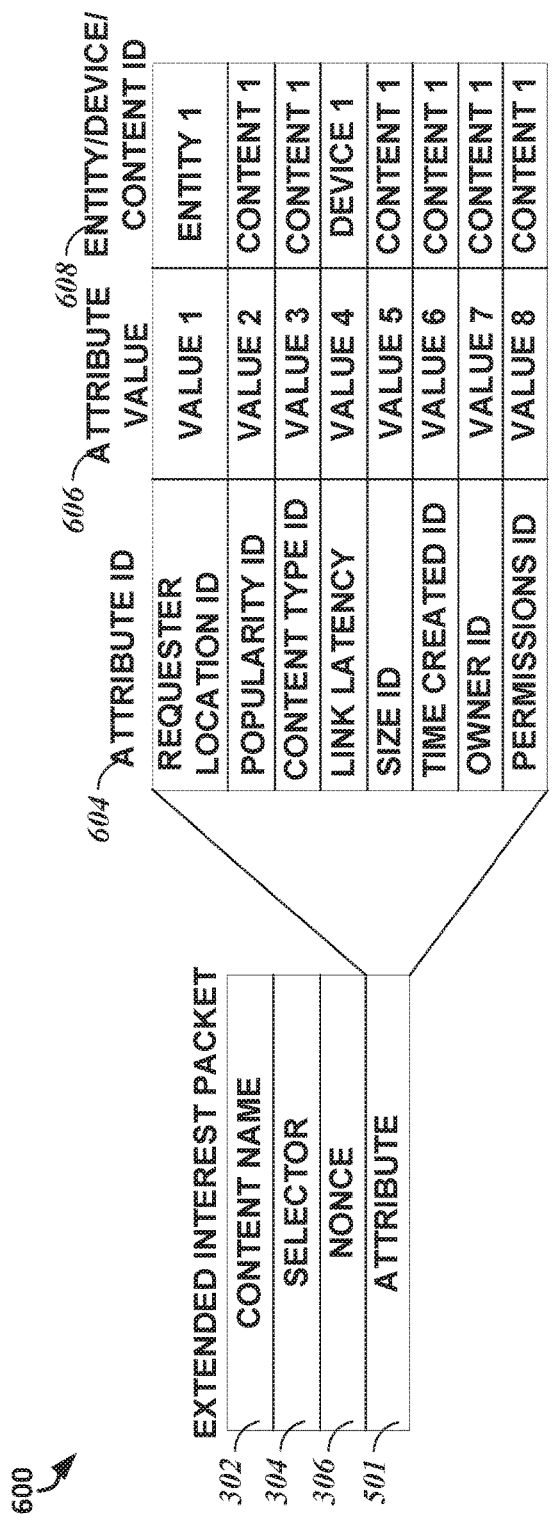
FIG. 12 illustrates, by way of example, a logical diagram of an embodiment of an extended interest packet.
FIG. 13 illustrates, by way of example, a logical diagram of an embodiment of an extended content store.

FIG. 12 illustrates, by way of example, a logical diagram of an embodiment of an extended interest packet 600. The extended interest packet 600 as illustrated includes the attribute field 501. The attribute field 501 may carry one or more attribute values for one or more attributes. Each attribute may include an attribute identification that identifies the attribute to which the attribute value corresponds, a corresponding entity, device, or content identification that identifies a user, device, or content to which the attribute is associated.

The attribute field 501 of the interest packet 600 as illustrated includes an attribute identification sub-field 604, an attribute value sub-field 606, and an entity/device/content identification sub-field 608. Each attribute provided in the attribute field 501 is identified with a specific attribute value through the attribute identification sub-field 604. The attribute value sub-field 606 is associated with the attribute identified by the attribute identification sub-field 604. The entity/device/content identification sub-field 608 is used to bind the attribute value sub-field 606 and associated attribute identification sub-field 604 with a specific user, device (e.g., a node, such as a router or CP), or content.

FIG. 13 illustrates, by way of example, a logical diagram of an embodiment of an extended content store 700. The extended content store 700 as illustrated includes a content name field 702 and data field 704 along with a plurality of attributes of the content corresponding to the content name field 702.

The extended content store 700 as illustrated includes a plurality of attributes including a lineage attribute field 706, a popularity attribute field 708, a content location attribute field 710, a time-to-live (TTL) attribute field 712, an access attribute field 714, and a quality of service (QoS) attribute field 716. The lineage attribute field 706 is populated with data regarding which devices contributed to the content, names of the original content and/or other names that have been associated with the content, locations of the original content, hardware or software that has processed the content, or the like. The popularity attribute field 708 may indicate, relative to other similar content or any other content, how many times the content, or a portion thereof, is requested in an interest packet and/or provided in response to an interest packet. The popularity content attribute field 708 is discussed elsewhere herein. The content location attribute field 710 indicates an additional location of the same content or a portion of the content.

The content location attribute field 710 may indicate another device and/or what portion of the content is stored at that location (if only a portion of the content is stored at the location). Such locations may provide redundancy, such as to help ensure that the data will remain accessible. Since nodes may leave the network, redundant data storage may help ensure the data remains accessible to nodes that remain in the network. The TTL attribute field 712 indicates a time after which the data is no longer valid or the data is superseded by newer data. The access attribute field 714 indicates which user(s) have permission to access the data and what type of access (e.g., read, write, and/or copy, or the like) each user is allowed. The QoS attribute field 716 indicates a relative priority of the content. The QoS attribute field 716 affects traffic prioritization and/or resource reservation, such as to help guarantee a certain level of performance in terms of latency, time from interest issuance to fulfillment, resolution of content provided, throughput, jitter, error rate, or the like.

FIG. 14 illustrates, by way of example, a logical diagram of an embodiment of an extended FIB 516. The extended FIB 516 details the name of the content in the name field 802, optionally details a next destination in the next field 804, and a plurality of attributes 806A, 806B, 806C, 806D, 806E, 806F, and 806G. The attributes 806A-G may be associated with the content named in the name field 802 and/or the device named in the next field 804. The attribute 806A provides a link latency of a device, the attribute 806B provides a type of link (e.g., wired, wireless, or more specific type of link, such as long term evolution (LTE), Wi-Fi, USB, Ethernet, or the like), the attribute 806C provides a quality of service (QoS) provided by the device, the attribute 806D provides an error rate provided by the link, the attribute 806E provides a bandwidth provided on the link, the attribute 806F provides a location of the device, and the attribute 806F indicates the functionality provided by the device (e.g., temperature, optical, pressure, oxygen, or other sensing, publishing, routing, searching, or the like).

Higher-Layer Search

Figure 15:
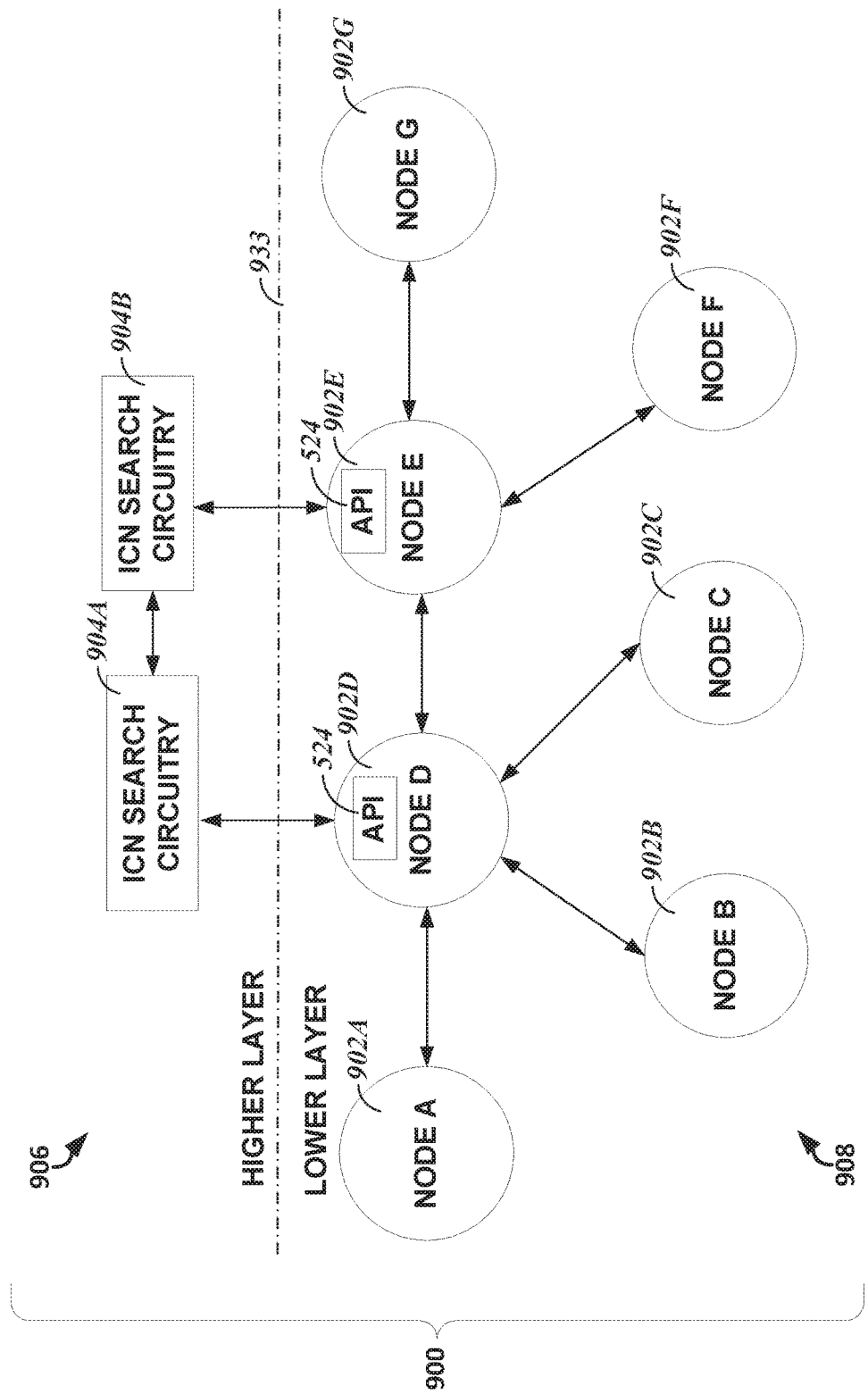
FIG. 15 illustrates, by way of example, a diagram of an embodiment of a portion of an ICN system that may provide a flexible search capability.

FIG. 15 illustrates, by way of example, a diagram of an embodiment of a portion of an ICN system 900 that may provide a flexible search capability. The flexible search capability does not require an exact match between a name for content in an interest packet and a name for content as stored in a content store. The system 900 as illustrated includes a plurality of nodes 902A, 902B, 902C, 902D, 902E, 902F, and 902G in a lower layer with the nodes 902D-E communicatively coupled to ICN search circuitry 904A-B in a higher layer. An interface between the lower layer 908 and the higher layer 906 is indicated by dashed line 933.

The system 900 provides a search feature implemented in a higher layer than a layer on which the content of the nodes is present. The search feature is implemented using the ICN search circuitry 904A-B. In one or more embodiments, the higher layer 906 may include the layer 4 208 and the lower layer may include layer 1 202, layer 2 204, or layer 3 206. The search circuitry 904A-B may allow a node 902A-G to find a source (e.g., an alternative source) of information or a service provided by other nodes. One or more nodes may include an API 524 that may facilitate communication between the higher layer 906 and the lower layer 908. In the system 900, the nodes 902D-E include the API 524, respectively.

Consider an example in which the node 902B wishes to know whether nodes in the system 900 include specific functionality, such as offer a specific service, such as transcoding, caching, encoding, or the like. For this example, assume that the node 902B wants to know which nodes in the system 900 provide temperature information (e.g., store and/or record temperature data). To accomplish this, the node 902B may provide a content request to the node 902D. The node 902D may then, using the API 524 and/or the ICN search circuitry 904A-B, determine which nodes of the system 900 provide such information. The ICN search circuitry 904A may query the search circuitry 904B (and/or other search circuitry of the system 900) for such information. The search circuitry 904B may provide a content request, or other communication, to the node 902E, for the requested information. The node 902E may query other nodes 902F-G and/or respond to the request, such as without querying the other nodes, such as in an embodiment in which the node 902E has prior knowledge of the requested information).

The node 902D is a parent node to the nodes 902F-G and may have information stored, such as in a content store, FIB, or other location of the memory 506, regarding the functionality, content, capabilities, or other parameters of the child nodes 902F-G. Thus, in one or more embodiments, the parent node may act as a sort of proxy for the child node(s). The node 502E may respond to the request, such as by providing a communication to the node 502D, such as through the search circuitry 504A-B and/or the API 524. A child node communicates to other nodes through another node and a parent node is the node through which the child communicates to other nodes.

As discussed, the nodes that have ICN search capability (e.g., the nodes 902D-E) may include a repository (e.g., a database, a relational database, or other table or storage mechanism) of the capabilities and services of children nodes (e.g., a service table, such as may be part of the memory 506). The memory 506 is an example of such a repository. Accordingly, at least the nodes having ICN search implemented (e.g., the nodes 902D-E of FIG. 15) may act as a proxy for child nodes. The ICN search circuitry 904A-B may send one or more queries to other ICN search nodes 902D-E that may decode the search queries and respond appropriately to searches by, for example, returning search results, forwarding search results, or the like. In another embodiment, a centralized search server (not shown in FIG. 15) may additionally or alternatively receive queries from the node 902A-G and respond with search results.

Accordingly, embodiments may provide a fourth layer 208 (e.g., transport layer) or other higher layer search functionality for ICN search. The ICN search may be implemented on all ICN nodes, or a subset of ICN nodes, to provide information to nodes that query for information. In embodiments, searches may be distributed in any fashion. For example, if one node receives a search query, that node may respond to the query with or without using a higher-layer node and/or a centralized server.

Popularity Count

Embodiments may provide enhanced efficiency in the caching of data, such as content for which a popularity count is used for caching. A subscriber's request for content (e.g., an entity that issues an interest packet) may be presented to multiple publishers and the popularity count for the content may only be incremented once, such as by a node that fulfills the request. The popularity count may be stored in the popularity field 708 in the extended content store 518. Embodiments implemented in ICN may provide for global popularity counts, global naming and fast, efficient lookup, and/or improved data expiration strategies for individual caches. Counters (e.g., a popularity field) may be maintained in a centralized counter, or counters may be maintained for each content or type of content, or for each publisher of content. Counters may be maintained in a hierarchical fashion (e.g., one counter may be maintained for one class of content comprised of several different sub-types of content).

Embodiments may provide look-up tables to populate the availability and location for a name or object. The popularity count may be identified using a globally unique name. A global counter may have a globally unique name, and a sub-counter may have a local name or a local instance of the global name. The global counter may be regularly updated using the local counters. Sub-counters may be updated in a distributed fashion or in a central fashion, and global counters may also be updated in a central fashion or in a distributed fashion.

A higher-layer service, operating above the ICN layer (see FIG. 10), may maintain popularity counts for each name observed on forwarded packets or queries. This service may maintain a value indicating the likelihood that future interest (e.g., queries) for a name will be satisfied. Thus, the popularity count may track requests, as well as "hits" on a particular name, query, etc.

Embodiments may maintain privacy by minimizing the use of global namespaces, and by configuring services to disregard all interests under a "/localhop" and "/localhost" namespace, by way of example, or other similarly named namespaces. To maintain a global popularity count, such a service may communicate between network nodes in various embodiments. For example, one implementation of an embodiment may use disjoint sets to partition the network subtrees and update only the parents with their subtree's popularity counts. This approach may allow for compression and/or "lazy" evaluation (the global popularity for a name may only be computed when requested). In some embodiments, popularity may be maintained hierarchically. Local or proximate popularity counts may be generated by disseminating a packet that snoops all the caches or a subset of the caches some number of hops or times to live (TTLs) away. In embodiments, the count mechanism may resemble a traceroute in that the count mechanism goes out a certain number of hops, collects info, and then retraces steps to merge the results. Popularity counts according to various embodiments may improve data expiration strategies for individual caches. Additionally, popularity counts, according to various embodiments, may improve collaborative caching strategies, in which multiple caches within an ICN island or within a group or subset or network of ICN-capable devices, select an optimal place for the data to reside, to reduce redundancy when network resources, storage resources, or any other resources are scarce.

The popularity count may have a hierarchical structure in some embodiments. For example, at one level, subscribers may wish to earn the hits for a particular publisher of local weather. At another level, the count may be related to the number of requests that were submitted for local weather from any publisher. The counts may then be generalized to requests for local weather across a state or region.

Some embodiments provide for approximate distributed tracking by providing techniques for maintaining popularity ratings without tracking the exact number of requests. Such embodiments may be used to study trends in general, for example, to study popularity of content over time.

In ICN networks, the publisher or the original source of the information cannot keep track of the global or regional count of requests for their data. One technique may include, for each node that has connectivity beyond a specified number of nodes to add up (e.g., accumulate or tally) requests for a particular name, content type, or the like. This may result in redundancies in some implementations, but may be reliable enough to provide trend data.

If a node is interested in the approximate popularity count for a particular search (e.g., "weather") or for data from a particular publisher having a particular name, the node may send an "interest packet" to retrieve the popularity count for a specific object. An interest packet may include a query of any type, in other words an interest packet is sent when a node or subscriber is interested in retrieving a particular type of data. This "interest packet" for retrieving the popularity count may be separate and distinct from a typical interest packet meant to retrieve the data itself or may be an extended interest packet. The interest packet may include other parameters, such as a time frame for which the popularity count is requested. When a node receives such an interest packet the node may generate a data packet in response to the interest packet which is based on the node's count of the number of data requests (e.g., queries or other content requests) that the node received.

If the popularity of a specific name is requested, the node may compute the exact count of the requests and send a content packet to the subscriber indicating the origin of the popularity count. Alternatively, if the popularity counts of a number of names are requested, then one option is that each node orders the relative number of requests for each publisher and sends this in response to the interest packet.

To ensure that all responses are routed back to the subscriber (generally in ICN, once there is a response to the request, the response is deleted), there are at least two options. The first option is for the subscriber to re-send the requests after receiving each data packet with the same information. The nodes that have already responded to the interest packet keep track of the interest packet and do not re-send the same response. This may help ensure that all nodes are able to respond to the request.

As a second option, each routing node may differentiate between a data packet and a packet requesting a popularity count. If a routing node sees the response is to an interest packet for a popularity count, the routing node realizes that there may be multiple responses for the same interest packet. In such a case, the routing node may route all packets back to the subscriber. If the subscriber receives multiple packets from a same node, the subscriber may avoid double counting by matching the information to the source of the information. This method may also reduce the number of interest packets that need to be re-sent and therefore signaling overhead may be reduced in at least these embodiments.

Some embodiments may also provide exact tracking of popularity counts, using a centralized or distributed method for tracking. A centralized tracking method may include the popularity count being implemented in a higher layer. Each parent node may collect the information from its children about the number of requests that the child node has received, and the parent node may then send this number to other parent nodes. The other parent nodes may combine the information from children nodes or send information to the requester.

Figure 16:
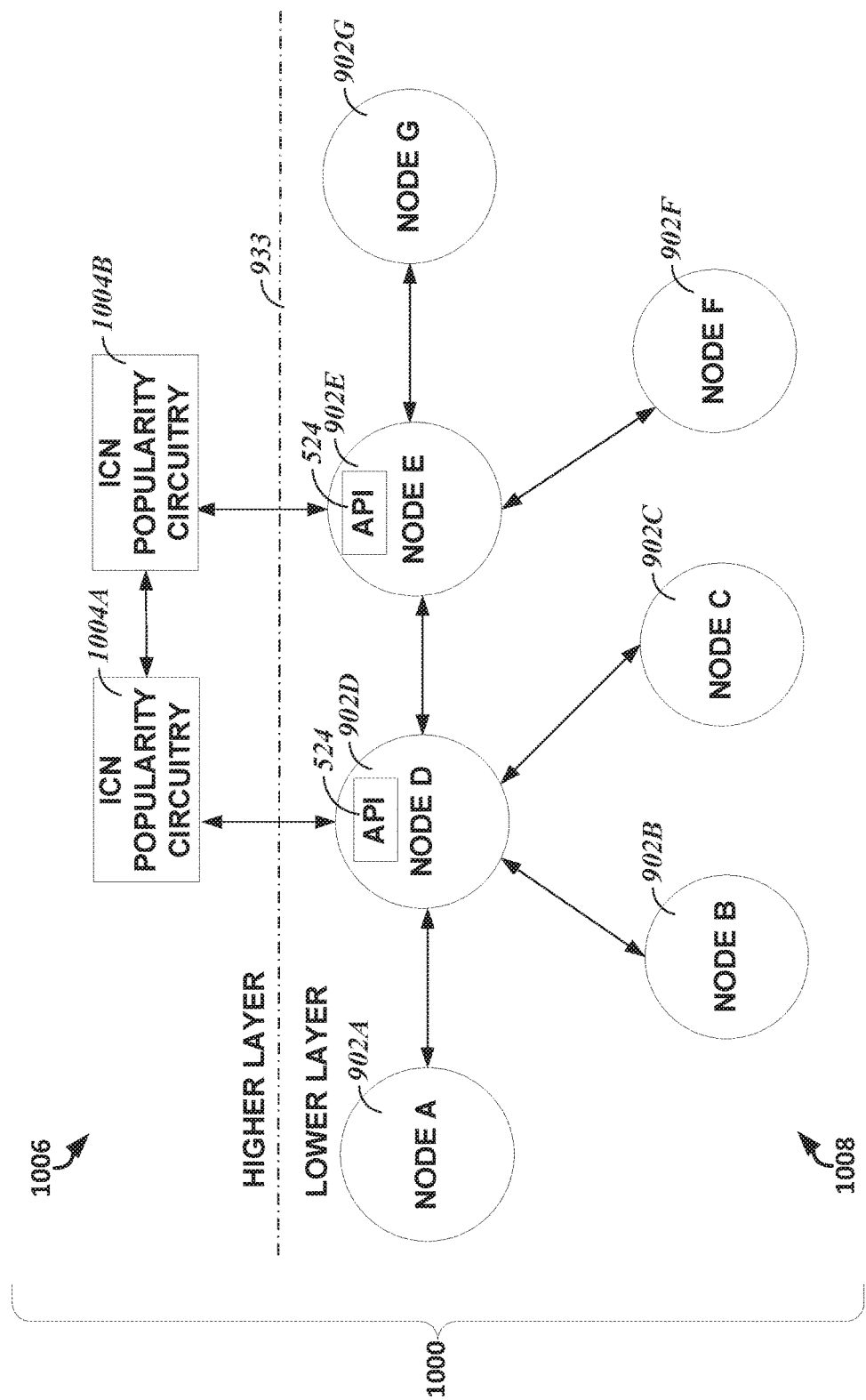
FIG. 16 illustrates, by way of example, a logical diagram of an embodiment of a centralized system for tracking of popularity counts.

FIG. 16 illustrates, by way of example, a logical diagram of an embodiment of a centralized system 1000 for tracking of popularity counts. The system 1000 is similar to the system 900, with the system including ICN popularity circuitry 1004A and 1004B in place of the ICN search circuitry 904A-B. In the system 1000, the nodes 902D-E may monitor popularity information of content on its own content store and on respective content stores of its children nodes. The popularity count monitoring may be done in a manner similar to the search feature implemented at the higher layer 906 as described with regard to FIG. 15. If the popularity count technique is not standardized across all nodes, the popularity count produced may be less than the actual popularity count.

A popularity count for a piece of content may be incremented (plus one) for each time the content is requested, such as in an interest packet, and/or each time the content is provided to fulfill an interest packet, such as in an instance where wildcard searching is being used. A node that forwards an interest packet without fulfilling the interest packet may not increment the popularity count. In one or more embodiments, content may be provided in error. In some embodiments, a popularity count may be more accurately maintained at the node that issues the interest packet than the node that fulfills the interest packet. If the content provided to fulfill the interest packet is sufficient, the popularity count may be incremented. If the content provided to fulfill the interest packet is not sufficient, the popularity count may not be incremented. In this manner, each node that actually used the content increments the popularity count.

The nodes 902D-E may issue an interest packet for popularity data, such as may specify that popularity data is requested. The interest packet may further specify a time period to which the popularity data requested pertains. Such an interest packet may include a content name field 302 with a specified name that is known to be for popularity data. The interest packet may be an extended interest packet that includes an attribute field 501 that specifies the time frame over which the popularity data is requested. The node 902D-E may provide the popularity data to the ICN popularity circuitry 1004A-B.

In some embodiments for popularity count, after a node collects or calculates the popularity count, the node has the option to respond with a content packet that has the information it calculated. The content packet may include an indication of a method used for computing the popularity and/or a time period over which the popularity data was collected. The content may be provided in a content packet, such as an extended content packet 510 with the time data listed in the attribute field 503. Embodiments may also include implementations of popularity count servers that keep track of popularity information and that store popularity information for provisioning upon request by subscribers or other nodes. Such an embodiment is illustrated in and discussed with regard to FIGS. 16 and 17.

Figure 17:
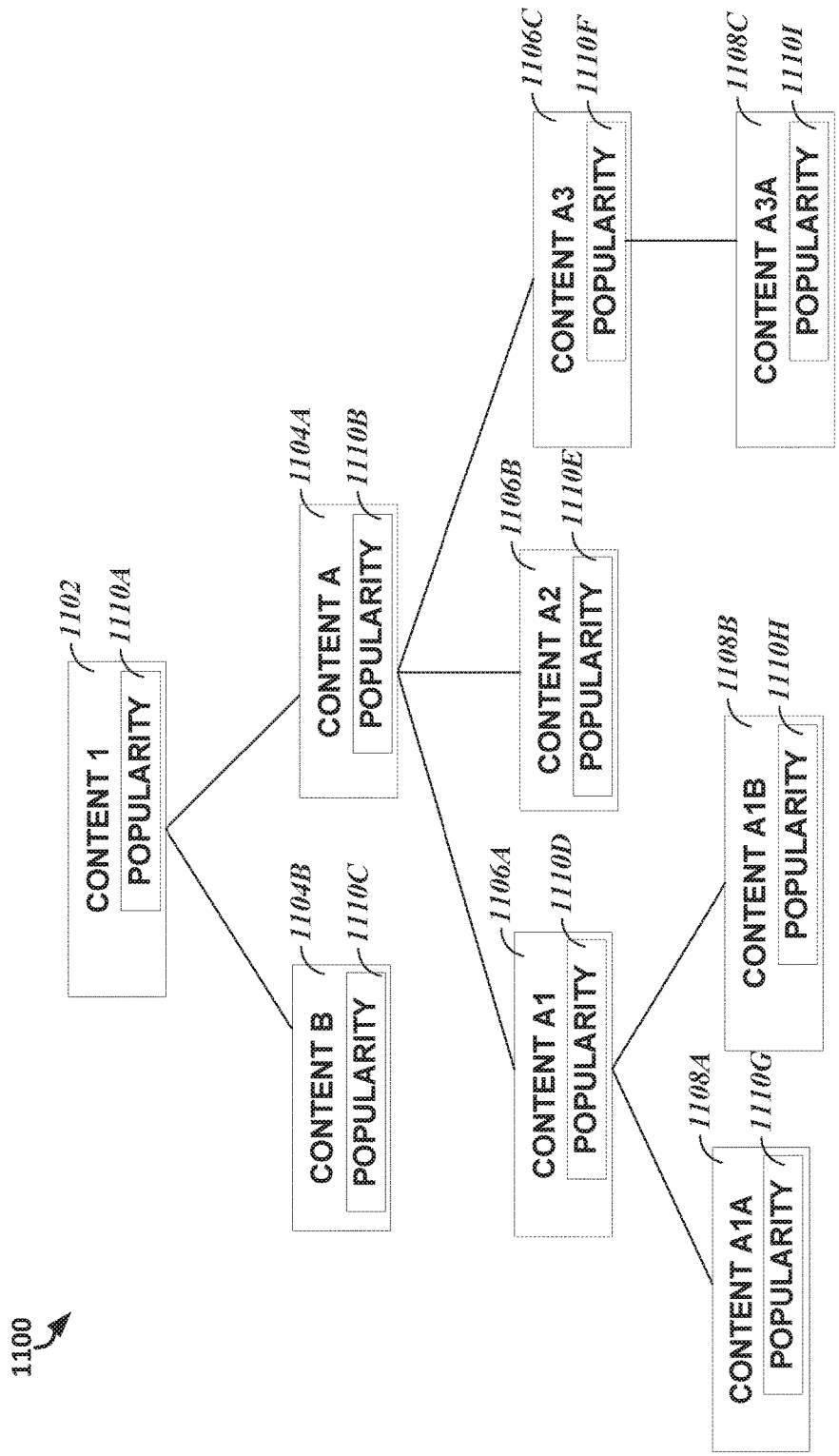
FIG. 17 illustrates, by way of example, a conceptual block diagram of an embodiment of a content popularity tree.

FIG. 17 illustrates, by way of example, a conceptual block diagram of an embodiment of a content popularity tree 1100. The content popularity tree 1100 includes content 1102, content subsets 1104A and 1104B, content sub-subsets 1106A, 1106B, and 1106C, and content sub-sub-subsets 1108A, 1108B, and 1108C. Each of the content 1102, subsets 1104A-B, sub-subsets 1106A-C, and sub-sub-subsets 1108A-C includes a popularity counter, such as 1110A, 1110B, 1110C, 1110D, 1110E, 1110F, 1110G, 1110H, and 1110I. The content 1102, for example, may include a video, a text or other document, an audio file, or the like. Consider an example in which the content 1102 is a movie (e.g., combination of audio and video file). The content subsets 1104A-B may be longer clips from the movie, the content sub-subsets 1 106A-C may be smaller clip of the longer clip of the subset 1104A. The content sub-sub-subsets 1108A-B may be just the video portion and just the audio portion of the smaller clip of content sub-subset 1106A, respectively, and so on.

In one or more embodiments, the popularity counter of content at one place in the tree may depend on the popularity count of the nodes below the node corresponding to the content in the tree 1100. For example, the popularity counter 1110A may include a sum, weighted sum, or other combination of the values of the popularity counters 1110B-I. In this manner, the popularity of the movie may be based on the number of times the entire movie or any audio or video segment of the movie is provided (correctly) in response to an interest packet.

In one or more embodiments, the popularity counters may be independent of values of other popularity counters in the tree 1100. For example, the popularity counter 1110A for the content 1102 may be determined based on only the number of times the content 1102 is provided (correctly) in response to an interest packet.

To summarize, some popularity count embodiments may be provided in look up tables, stored in any database or set of databases, such as to facilitate global naming. Counters and sub-counters may be provided in a hierarchical fashion. Sub-counters and counters may be updated in a distributed way or a centralized way, and redundant counting may be eliminated using methods describe earlier herein. Sub-counters may be updated according to results of other sub-counters in the hierarchy. Simple, approximate, and exact popularity counts may be provided to serve different needs. For example, if only trend data is needed, exact popularity counts may not be provided or maintained at least for subscribers or nodes that are interested in trend data. Counters may be implemented at the transport layer or at any other layer, and a routing protocol may be provided wherein multiple data packets may be sent in response to a single interest packet of any type.

Smart Naming in Reverse CDN (rCDN)

Embodiments also provide for different content delivery options than may be available with current networks. Current content delivery network (CDN) architectures distribute data from a few providers to a large number of users. However, networks for serving the Internet of Things (IoT) devices may benefit from a "reverse CDN" model to support, for example, video content coming from a large number of distributed, and possibly mobile, edge nodes and being served to multiple applications.

Sometimes, the same edge caching/storage infrastructure usage by multiple tenants and the same information may be available in different levels of quality (for example in streaming video CDN caches). Another example scenario may be implemented with IoT networks of distributed sensors (such as cameras, temperature sensors, etc.). In at least these networks, information is available (cached, or "live") from a number of sources, with the different sources possibly having similarity in some attributes. For example, in such a "reverse CDN" of information, if a subscriber requests a temperature sensor reading, or a video capture from a particular location, publishers from other nearby locations could also have information that is capable of meeting the requirements.

ICN may help allow smart retrieval of distributed cached data thanks to its content-centric approach. However, ICN may lack a rich, smart and efficient naming scheme to service different requests made on complex data schemes such as video content.

FIG. 18 illustrates, by way of example, a logical diagram of an embodiment of the name field 702. The name field 702 as illustrated includes attributes appended to a content name, such as to help facilitate wildcard searching.

Smart naming may be provided by deriving names, such as from the output of real-time analytics, such as may result in a sort of metadata. Video analytics may be provided in some embodiments. For example, video analytics may identify people, situations, and objects in video scenes and provide names thereof, such as in the entities section of the name field 702. Speech recognition may be performed to identify objects and/or situations described in video content, and such objects and/or situations may be identified in the name field 702, such as a shown in FIG. 18. Name fields may be added based on surveillance camera location, public safety data, "nanny cams," or the like. When multiple named video streams are aggregated, a new name may be derived from the original names. Names may show video characteristics of the original video, descriptions of the hardware used, and other capabilities of hardware. Consider the tree 1100, and assume that the content 1102 is comprised of the subsets 1104A-B. The name of the content 1102 may include a portion of each of the names of the content subsets 1104A-B or other combination of the names of the content subsets 1104A-B. The lineage attribute field 706 may be used to help record where data came from, owners of the data, names of content used to create the content, among other attributes.

Consider, again, the example of the content 1102 being derived from the content subset 1104A-B and consider further that the content subset 1104A has different access restrictions than the content subset 1104B. The access restrictions of the content 1102 may be a union of the access restrictions of the content subset 1104A-B or other combination of the access restrictions.

Figure 19:
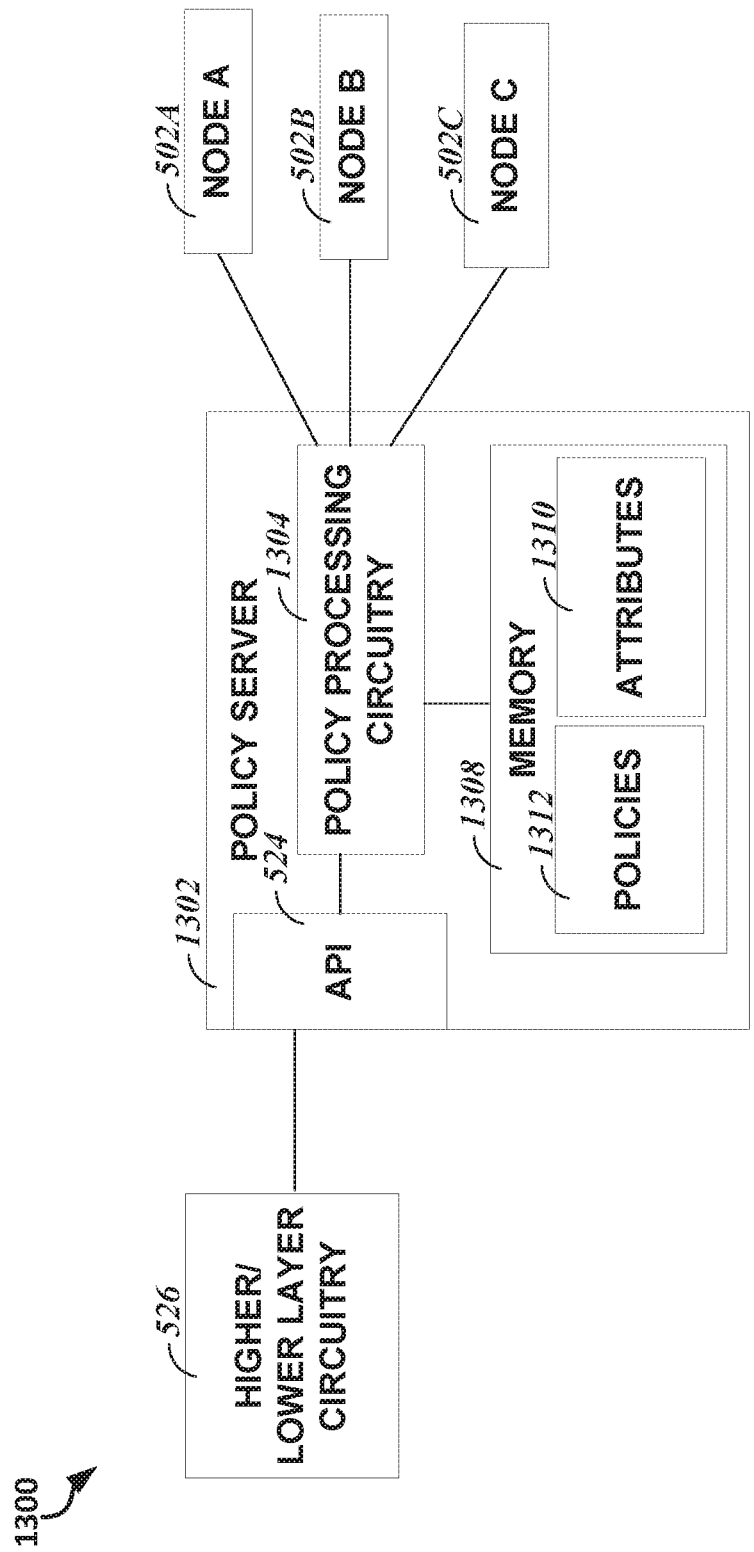
FIG. 19 illustrates, by way of example, a logical block diagram of an embodiment of a portion of an ICN system.

FIG. 19 illustrates, by way of example, a logical block diagram of an embodiment of a portion of an ICN system 1300. The system 1300 as illustrated includes the higher/lower layer circuitry 526, a policy server 1302, and a plurality of nodes 502A-C. The API 524B and higher/lower layer circuitry 526B may be similar to, or the same as the API 524A and higher/lower layer circuitry 526A as shown in FIG. 11. The higher/lower layer circuitry 526, in one or more embodiments, may include electric or electronic components, such as may include components similar to that discussed with regard to the routing circuitry 504. The higher/lower layer circuitry 526 may monitor performance of packet transit in the content layer 208. The performance may be recorded as one or more attributes that may be provided to the node 502A-C and/or the policy server 1302. The attributes may include a QoS, a link latency, a type of connectivity interface available at the router, different attributes for UL and DL using the interface, or other network attributes as discussed herein.

The policy server 1302 as illustrated includes policy processing circuitry 1304, the API 524, and a memory 1308. The policy processing circuitry 1304 may include electric or electronic components (e.g., similar to the routing circuitry 504). The policy processing circuitry 1304 may be configured to receive a packet from one of the nodes 502A-C or the API 524. The packet may include an interest packet that includes a content name field that names a policy or the policy may be defined in the content store (e.g., in the access field 714). The policy named may be one of a plurality of policies 1312 in the memory 1308. The policies 1312 may each be named using a same convention as is used to name content that is published by a publisher in the ICN. In such an embodiment, a policy may be retrieved using an interest packet in a manner similar to that used in retrieving content.

The policy processing circuitry 1304 may record updates to policies 1312 and/or attributes 1310, such as may be provided by the higher/lower layer circuitry 526 through API 524 or by the node 502A-C. The policy processing circuitry 1304 may perform analytics on performance of the policies. The analytics may determine which policies lead to lower time latency between interest packet issuance and fulfillment, higher QoS, successful delivery of content with error below a specified threshold, or the like.

The policy processing circuitry 1304 may, in one or more embodiments, periodically poll the higher/lower layer circuitry 526 for attribute information that may be used in the analytics, stored in the attributes 1310, and/or forwarded to the nodes 502A-C, such as to be used in determining a next node to which to forward a packet. The policy processing circuitry 1304 may, in one or more embodiments, poll the higher/lower layer circuitry 526 in response to occurrence of one or more specified events. The events may include a specified number of policies requested, a specified time elapsing since a last attribute request, a router query including a request for data not available at the policy server 1302, or other event.

A policy may be: (A) Known/static to all routers (e.g., standardized), (B) Semistatic/semidynamic (e.g., available through a policy server 1402), (C) Dynamic (goes with the data). A policy defines which attributes are used in making a routing decision and how they are used in the overall routing decision, such as to accommodate the requesting device's desire as well as the network capabilities.

The routing circuitry 504 may issue a query to the policy server 1302, such as to retrieve one or more policies therefrom. The policy governing the routing decision is not only determined by content specifics, but also on the attributes of devices to which the packet may be routed as well as one or more attributes of the endpoint requesting the content. For example, lower layer radio level information (e.g., link quality, air interface type, availability of multiple interfaces, etc.) as well as requesting devices capabilities that might impact route selection, as attributes to be used in routing decisions. Hence, before the ICN router forwards the packet of interest to the next node, the router may query the policy server 1302 to retrieve one or more policies governing the requested content as well as route specific forwarding policies. For example, a policy for delay or reliability sensitive content may indicate that the routing policy considers multicast of the packet wherever possible. In one or more embodiments, a policy may include a sort of greedy algorithm that includes combing all attributes and selecting a route using ranking.

Figure 20:
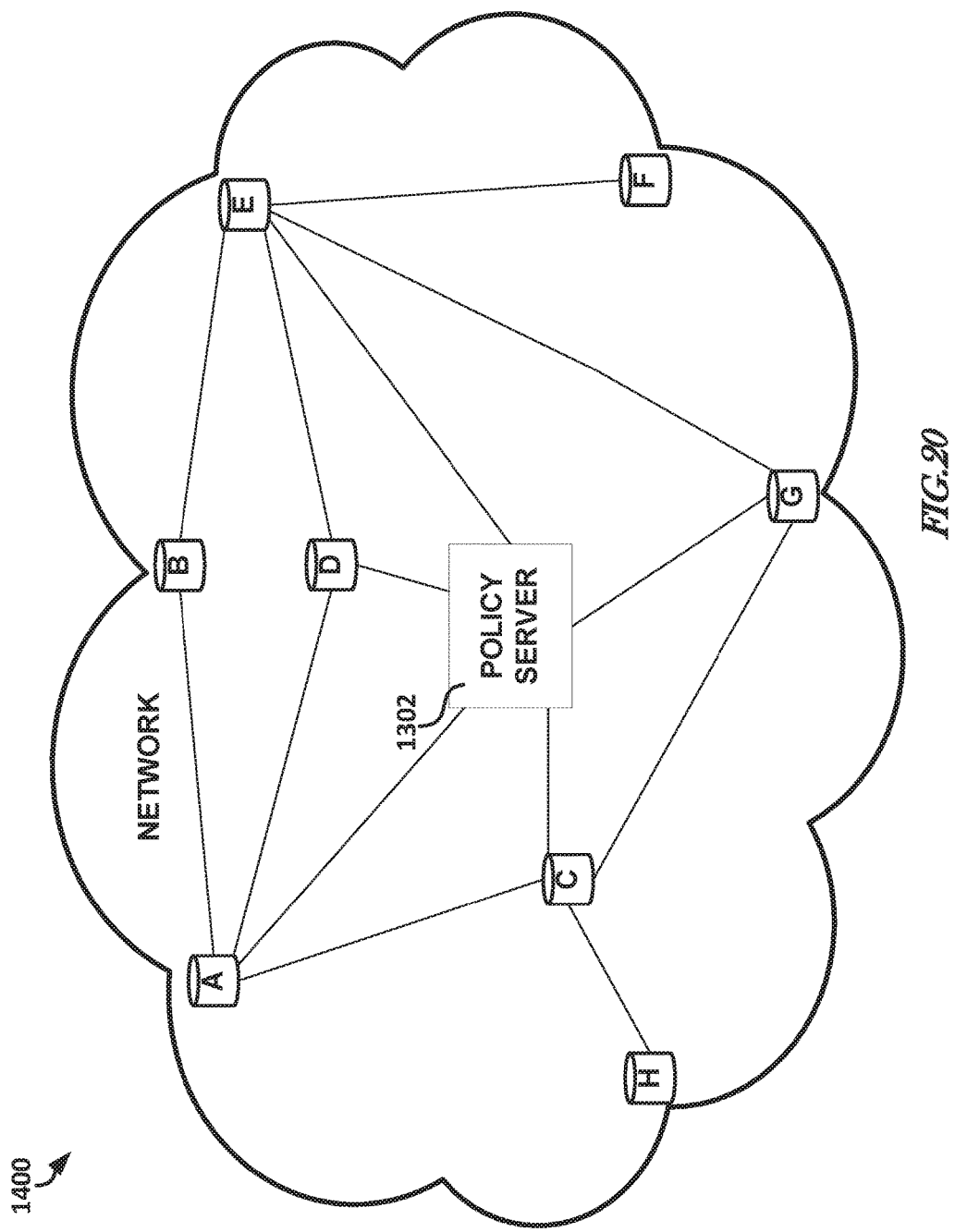
FIG. 20 illustrates, by way of example, a logical block diagram of an embodiment of a system that includes a centralized policy server.

FIG. 20 illustrates, by way of example, a logical block diagram of an embodiment of a system 1400 that includes a centralized policy server 1302. Each of the database symbols labelled with a letter represent a node, such as may be similar to the node 502A. A distributed policy server may include the policy processing circuitry 1304, API 524, and/or policies 1312 implemented on a plurality of the nodes, such that policy enforcement for the system 1400 depends on operation of multiple of the nodes.

Typical ICN content and caches (e.g., memories or content stores) are designed to broadly share their contents to increase performance and utility. However, that does not take into account the access control policies 1312 of the content throughout its lifecycle. For example, if an interest packet is provided for a named piece of content, the answer to such an interest packet may be provided from a cache. However, if the requester does not have permissions to see that cached data, (e.g., if the permissions do not match permissions generated when the data was created, or at any other time after creation, or according to a policy) the data should be discarded before the subscriber, node, or other recipient views the data. In that case, the interest packet should not be annotated as having been fulfilled. By not sending data due to insufficient permissions, network overhead may be reduced and cache sizes and cache pollution may be reduced. Accordingly, embodiments may provide access policies to be implemented against ICN interest packets, content, and/or cached content. Such information may also be used as an attribute for security policy-driven attribute-based routing. The policy or policies associated with content may be identified in the access field 714 (see FIG. 13). The one or more policies may be retrieved from a dedicated node (e.g., the policy server 1302), a router node, or other node in the ICN.

When multiple streams are aggregated as with a reverse CDN (rCDN), the policies attached to the individual data streams are to be preserved in the aggregated stream. If this is not possible or if the policies conflict, then the aggregation function will fail. By using Boolean logic, such as may be implemented by the policy processing circuitry 1304, aggregation functions may be defined to determine if there are conflicting state and permissions rules left in the union of the policy information. For at least these reasons, embodiments provide a method for communicating and maintaining data access policy through the data lifecycle in the ICN, including enabling of caches to broker policy access due to policy being present and available. Embodiments further provide mechanisms for aggregating policy information on aggregated or modified data.

Smart Publish/Subscribe

Embodiments may additionally or alternatively provide for a more selective publish/subscribe model. One publish-subscribe model of ICN routing occurs in a blind manner, with publication being according to an open advertisement/broadcast model with subscribers expressing interest in the published content without a guarantee that the subscribers have sufficient resources to handle the content. Embodiments provide selective publish/subscribe methods for efficiently handling large amounts of data, for example, such as may include video data.

Embodiments provide selective publication with an indication of some requirements in terms of rCDN tiers or video processing capabilities on rCDN nodes. These embodiments may make use of smart naming as described earlier herein. rCDN nodes complying with publication requirements may only be able to subscribe to permitted content. Smart naming in the subscription, such as is previously discussed, in the interest request (e.g., interest packet) may therefore be provided.

In some embodiments, rCDN nodes may publish content in a selective manner. For example, rCDN nodes may publish only to defined tiers. In some embodiments, rCDN nodes may publish within a certain number of hops from a defined tier within the rCDN infrastructure. This may happen in scenarios where the first edge rCDN node caches content for a limited time then uploads caching to another tier. For example, consider the system 900. The nodes that are children, the nodes 902A-C and 902F-G, may comprise a first tier of nodes and the parent nodes 902D-E may comprise a second tier of nodes. The first tier of nodes may collect and cache data for a specified period of time and then upload the cached data to the second tier, which in turn may cache the data for a specified period of time before it uploads the data to a next tier and so on.

In some embodiments, publication may be permitted only to rCDN nodes with a specific hardware capability or set of capabilities, such as may be provided in any of the attributes fields discussed herein. For example, publications may be limited according to transcoding requirements when sending high/very high resolution video content to other rCDN nodes for more compression, or transcoding to low resolution, such as for more efficient long term caching. Publication may be permitted or denied based on video analytics requirements in some embodiments when sending video streams to rCDN nodes running video analytics to extract useful scenes and or to do video summarization.

In some embodiments, each rCDN node may play the role of an intermediate content consumer by subscribing to content while declaring hardware and platform capabilities in a subscription request (e.g., an extended interest packet). IoT services may subscribe to video content based on service types and requirements or needs, by using appropriate names in subscribe messages. For example, the Department of Transportation may subscribe to traffic management services and request a summary of traffic conditions each day. As another example, a corporate building may subscribe to building security services and request a video summary each day. Clinical staff may subscribe to a health service and request videos of a psychiatric patient's behavior in real time. Airport security may subscribe to a people tracking service and request videos of people or photographs of faces in real time. Content providers may handle customized content requests and process such requests. Naming in accordance with various embodiments may permit matching content to be served to a consumer. Some processing may be provided before serving content, for example, a request for a traffic summary may include the name of the summary in the request to identify the content, but content will still be summarized before sending to the subscriber. Similarly, or other extractions or processing may be done to extract, for example, particular videos or photographs requested by a subscriber. In some embodiments, each rCDN receiving a subscription request for video content in its cache will run a name matcher algorithm to see if the names specification for the content name in the subscription request matches the content name that is published with the content. If a match occurs (or if a match occurs with a specific accuracy or closeness based on policy or any other criteria) then the content is delivered to the subscriber.

Edge Network Architecture

Figure 21:
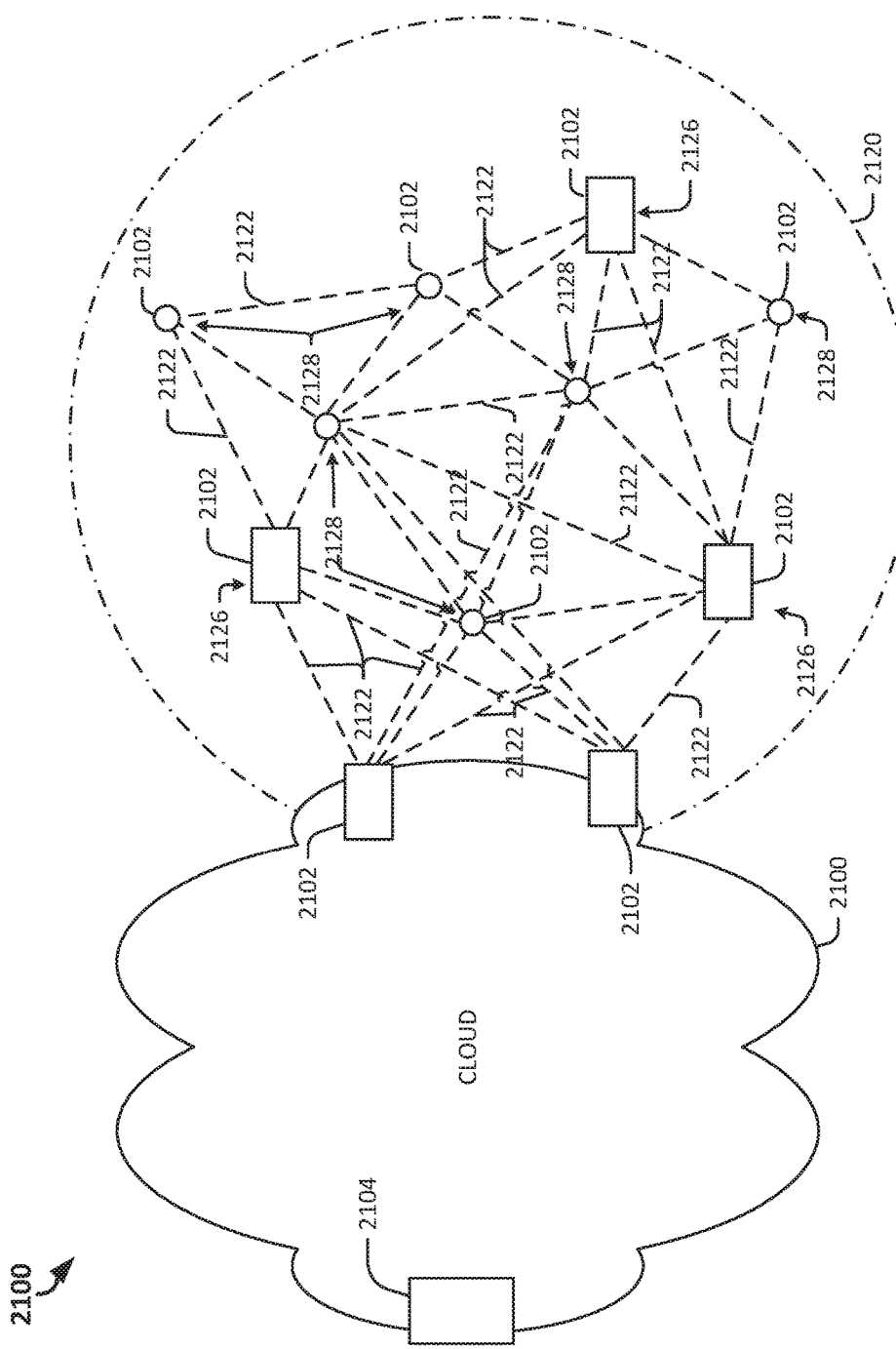
FIG. 21 illustrates, by way of example, a diagram of a cloud computing network, or cloud, in communication with a mesh network of IoT devices, that may be termed an edge network, operating at the edge of the cloud.

FIG. 21 illustrates, by way of example, a diagram of a cloud computing network, or cloud 2100, in communication with a mesh network of IoT devices 2102, that may be termed an edge network 2120, operating at the edge of the cloud 2100. To simplify the diagram, not every IoT device 2102 is labeled.

The edge network 2120 may be considered to be a massively interconnected network wherein a number of IoT devices 2102 are in communications with each other, for example, by radio links 2122. This may be performed using the open interconnect consortium (OIC) standard specification 3.0 released by the Open Connectivity Foundation™ (OCF) on Dec. 23, 2015. This standard allows devices to discover each other and establish communications for interconnects. Other interconnection protocols may also be used, including, for example, the optimized link state routing (OLSR) Protocol, or the better approach to mobile ad-hoc networking (B.A.T.M.A.N.), among others.

Three types of IoT devices 2102 are shown in this example, gateways 2124, data aggregators 2126, and sensors 2128, although any combinations of IoT devices 2102 and functionality may be used. The gateways 2124 may be edge devices that provide communications between the cloud 2100 and the edge network 2120, and may also provide the backend process function for data obtained from sensors 2128, such as motion data, flow data, temperature data, and the like. The data aggregators 2126 may collect data from any number of the sensors 2128, and perform the back end processing function for the analysis. The results, raw data, or both may be passed along to the cloud 2100 through the gateways 2124. The sensors 2128 may be full IoT devices 2102, for example, capable of both collecting data and processing the data. In some cases, the sensors 2128 may be more limited in functionality, for example, collecting the data and allowing the data aggregators 2126 or gateways 2124 to process the data.

Communications from any IoT device 2102 may be passed along the most convenient path between any of the IoT devices 2102 to reach the gateways 2124. In these networks, the number of interconnections provide substantial redundancy, allowing communications to be maintained, even with the loss of a number of IoT devices 2102. Further, the use of a mesh network may allow IoT devices 2102 that are very low power or located at a distance from infrastructure to be used, as the range to connect to another IoT device 2102 may be much less than the range to connect to the gateways 2124.

The edge network 2120 of these IoT devices 2102 devices may be presented to devices in the cloud 2100, such as a server 2104, as a single device located at the edge of the cloud 2100 (e.g., a fog 2120 device). In this example, the alerts coming from the edge network 2120 device may be sent without being identified as coming from a specific IoT device 2102 within the edge network 2120.

In some examples, the IoT devices 2102 may be configured using an imperative programming style (e.g., with each IoT device 2102 having a specific function and communication partners). However, the IoT devices 2102 forming the edge network 2120 device may be configured in a declarative programming style, allowing the IoT devices 2102 to reconfigure their operations and communications, such as to determine needed resources in response to conditions, queries, and device failures. As an example, a query from a user located at a server 2104 about the operations of a subset of equipment monitored by the IoT devices 2102 may result in the edge network 2120 device selecting the IoT devices 2102, such as particular sensors 2128, needed to answer the query. The data from these sensors 2128 may then be aggregated and analyzed by any combination of the sensors 2128, data aggregators 2126, or gateways 2124, before being sent on by the edge network 2120 device to the server 2104 to answer the query. In this example, IoT devices 2102 in the edge network 2120 may select the sensors 2128 used based on the query, such as adding data from flow sensors or temperature sensors. Further, if some of the IoT devices 2102 are not operational, other IoT devices 2102 in the edge network 2120 device may provide analogous data, if available.

Compute Device/System Architecture

Figure 22:
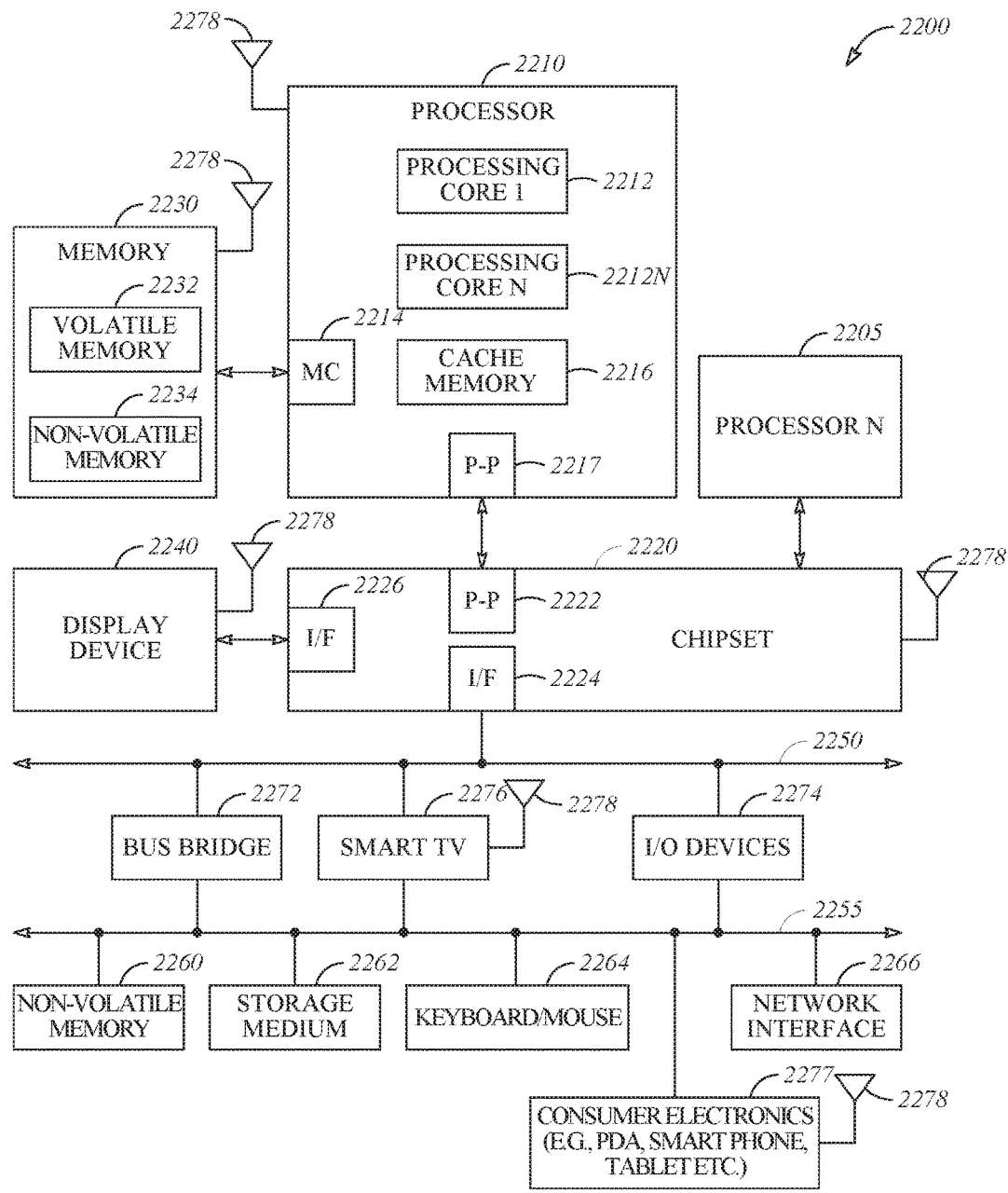
FIG. 22 illustrates, by way of example, a logical block diagram of an embodiment of a system.

FIG. 22 illustrates, by way of example, a logical block diagram of an embodiment of a system 2200. In one or more embodiments, the system 2200 includes one or more components that may be included in the node 502A-C, 902A-G, routing circuitry 504, API 524, higher/lower layer circuitry 526, ICN search circuitry 904A-B, ICN popularity circuitry 1004A-B, policy processing circuitry 1304, policy server 1302, sensor device 1502A-D, backend cloud 1504, processing circuitry 1604, rCDN node 1602A-C, and/or other component discussed herein.

In one embodiment, processor 2210 has one or more processing cores 2212 and 2212N, where 2212N represents the Nth processing core inside processor 2210 where N is a positive integer. In one embodiment, system 2200 includes multiple processors including 2210 and 2205, where processor 2205 has logic similar or identical to the logic of processor 2210. In some embodiments, processing core 2212 includes, but is not limited to, pre-fetch logic to fetch instructions, decode logic to decode the instructions, execution logic to execute instructions and the like. In some embodiments, processor 2210 has a cache memory 2216 to cache instructions and/or data for system 2200. Cache memory 2216 may be organized into a hierarchal structure including one or more levels of cache memory. One or more of the content stores 518 may be implemented as cache memories.

In some embodiments, processor 2210 includes a memory controller 2214, which is operable to perform functions that enable the processor 2210 to access and communicate with memory 2230 that includes a volatile memory 2232 and/or a non-volatile memory 2234. In some embodiments, processor 2210 is coupled with memory 2230 and chipset 2220. Processor 2210 may also be coupled to a wireless antenna 2278 to communicate with any device configured to transmit and/or receive wireless signals. In one embodiment, the wireless antenna interface 2278 operates in accordance with, but is not limited to, the IEEE 802.11 standard and its related family, Home Plug AV (HPAV), Ultra Wide Band (UWB), Bluetooth, WiMax, or any form of wireless communication protocol.

In some embodiments, volatile memory 2232 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 2234 includes, but is not limited to, flash memory, phase change memory (PCM), read-only memory (ROM), electrically erasable programmable read-only memory (EEPROM), or any other type of non-volatile memory device.

Memory 2230 stores information and instructions to be executed by processor 2210. In one embodiment, memory 2230 may also store temporary variables or other intermediate information while processor 2210 is executing instructions. The memory 2230 is an example of a machine-readable medium. While a machine-readable medium may include a single medium, the term "machine-readable medium" may include a single medium or multiple media (e.g., a centralized or distributed database, and/or associated caches and servers).

The term "machine-readable medium" may include any medium that is capable of storing, encoding, or carrying instructions for execution by a machine (e.g., the routing circuitry 504, the ICN search circuitry 904A-B, ICN popularity circuitry 1004A-B, policy processing circuitry 1304, and/or processing circuitry 1604) and that cause the machine to perform any one or more of the techniques of the present disclosure, or that is capable of storing, encoding or carrying data structures used by or associated with such instructions. In other words, the various circuitry discussed herein may include instructions and may therefore be termed a machine-readable medium in the context of various embodiments. Other non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In the illustrated embodiment, chipset 2220 connects with processor 2210 via Point-to-Point (PtP or P-P) interfaces 2217 and 2222. Chipset 2220 enables processor 2210 to connect to other elements in system 2200. In some embodiments, interfaces 2217 and 2222 operate in accordance with a PtP communication protocol such as the Intel® QuickPath Interconnect (QPI) or the like. In other embodiments, a different interconnect may be used.

In some embodiments, chipset 2220 is operable to communicate with processor 2210, 2205N, display device 2240, and other devices. Chipset 2220 may also be coupled to a wireless antenna 2278 to communicate with any device configured to transmit and/or receive wireless signals.

Chipset 2220 connects to display device 2240 via interface 2226. Display device 2240 may be, for example, a liquid crystal display (LCD), a plasma display, cathode ray tube (CRT) display, or any other form of visual display device. In some embodiments of the invention, processor 2210 and chipset 2220 are merged into a single SOC. In addition, chipset 2220 connects to one or more buses 2250 and 2255 that interconnect various elements 2274, 2260, 2262, 2264, and 2266. Buses 2250 and 2255 may be interconnected together via a bus bridge 2272. In one embodiment, chipset 2220 couples with a non-volatile memory 2260, a mass storage device(s) 2262, a keyboard/mouse 2264, and a network interface 2266 via interface 2224 and/or 2204, etc.

In one embodiment, mass storage device 2262 includes, but is not limited to, a solid state drive, a hard disk drive, a universal serial bus flash memory drive, or any other form of computer data storage medium. In one embodiment, network interface 2266 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the components shown in FIG. 22 are depicted as separate blocks within the system 2200, the functions performed by some of these blocks may be integrated within a single semiconductor circuit or may be implemented using two or more separate integrated circuits. For example, although cache memory 2216 is depicted as a separate block within processor 2210, cache memory 2216 (or selected aspects of 2216) may be incorporated into processor core 2212.

Examples and Notes

The present subject matter may be described by way of several examples.

Example 1 may include a component of an information centric network (ICN), the component comprising a memory including an extended content store that includes content from at least one other component of the ICN, and first attributes of the content, the first attributes including a content popularity value that indicates a number of requests for the content, and processing circuitry to increment the content popularity value in response to a transmission of a first content packet that includes the content, the first content packet transmitted in response to receiving an interest packet.

In Example 2, Example 1 may further include, wherein the memory further includes a subset of the content and second attributes of the subset of the content stored thereon, the second attributes including a subset popularity value that indicates a number of requests for the subset of the content.

In Example 3, Example 2 may further include, wherein the processing circuitry is further to increment the subset popularity value and increment the content popularity value in response to responding to the interest packet with a second content packet that includes the subset of the content.

In Example 4, at least one of Examples 2-3 may further include, wherein the processing circuitry is further to increment the subset popularity value and refrain from incrementing the content popularity value in response to responding to the interest packet with a second content packet that includes the subset of the content.

In Example 5, at least one of Examples 1-4 may further include, wherein the processing circuitry is further to issue a request for a third popularity value from another component that includes the content or the subset of the content, receive a third content packet in response to the issued request, the content packet including an indication of the third popularity value, and add the third popularity value to the content popularity value.

In Example 6, at least one of Examples 1-5 may further include, wherein the processing circuitry is further to issue a request for a third popularity value from another component that includes the content or the subset of the content, receive a content packet in response to the issued request, the content packet including an indication of the third popularity value, and add the third popularity value to the subset popularity value.

In Example 7, at least one of Examples 5-6 may further include, wherein the request for the third popularity value is issued to ICN search circuitry implemented at a higher layer of the ICN than a layer on which the content resides.

In Example 8, at least one of Examples 6-7 may further include, wherein the request is a second interest packet with a content name field that indicates a content name.

In Example 9, at least one of Examples 2-8 may further include, wherein the processing circuitry is further to manage the content based on the content popularity value and the subset popularity value.

In Example 10, Example 9 may further include, wherein the first attributes include a content retention priority corresponding to the content and the second attributes include a subset retention priority corresponding to the subset.

In Example 11, Examples 10 may further include, wherein the processing circuitry is further to reduce the content retention priority in response to a determination that the content popularity value is less than a priority threshold value.

In Example 12, Example 11 may further include, wherein the processing circuitry is further to compare the content retention priority to a retention threshold value, and in response to a determination to a determination that the content retention priority is less than the retention threshold value, remove the content from the memory.

In Example 13, Example 12 may further include, wherein removal of the content from the memory occurs further in response to a determination that the content retention priority is less than the subset retention priority.

Example 14 may include a component of a plurality of components of an information centric network (ICN), the component comprising a memory including content and an extended forward information base (FIB), the extended FIB including attributes of child components of the component, the attributes including one or more services provided by the child components, and processing circuitry to issue a request for an identification of a second component that provides a service not provided by the child components or the component as determined by the FIB, receive a content packet in response to the issued request, the content packet including the identification of the second component that provides the service, and forward the content to the second component associated with the identification.

In Example 15, Example 14 may further include, wherein the request for the identification is issued to ICN search circuitry implemented at a higher layer of the ICN than a layer on which the content resides.

In Example 16, at least one of Examples 14-15 may further include, wherein the processing circuitry is further to add the second component, the identification, and the service to the extended FIB in response to receiving the content packet.

In Example 17, at least one of Examples 14-16 may further include, wherein the request is an interest packet with a content name field that indicates the service requested.

In Example 18, at least one of Examples 14-17 may further include, wherein the content is stored in an extended content store of the memory that includes the content, and first attributes of the content, the first attributes including a content popularity value that indicates a number of requests for the content; and wherein the processing circuitry is further to increment the popularity value in response to a transmission of a second content packet that includes the content, the second content packet transmitted in response to receiving an interest packet.

In Example 19, Example 18 may further include, wherein the memory further includes a subset of the content and second attributes of the subset of the content stored thereon, the second attributes including a subset popularity value that indicates a number of requests for the subset of the content.

In Example 20, Example 19 may further include, wherein the processing circuitry is further to increment the subset popularity value and increment the content popularity value in response to responding to a second interest packet with a second content packet that includes the subset of the content.

In Example 21, at least one of Examples 19-20 may further include, wherein the processing circuitry is further to increment the subset popularity value and refrain from incrementing the content popularity value in response to responding to the interest packet with a second content packet that includes the subset of the content.

In Example 22, at least one of Examples 18-21 may further include, wherein the processing circuitry is further to issue a request for a third popularity value from another component that includes the content or the subset of the content, receive a third content packet in response to the issued request, the third content packet including an indication of the third popularity value, and add the third popularity value to the content popularity value.

In Example 23, at least one of Examples 18-22 may further include, wherein the processing circuitry is further to issue a request for a third popularity value from another component that includes the content or the subset of the content, receive a fourth content packet in response to the issued request, the fourth content packet including an indication of the third popularity value, and add the third popularity value to the subset popularity value.

In Example 24, Example 23 may further include, wherein the request for the third popularity value is issued to ICN search circuitry implemented at a higher layer of the ICN than a layer on which the content resides.

In Example 25, Example 24 may further include, wherein the processing circuitry is further to manage the content based on the content popularity value and the subset popularity value.

In Example 26, Example 25 may further include, wherein the attributes include a content retention priority corresponding to the content and a subset retention priority corresponding to the subset.

In Example 27, Example 26 may further include, wherein the processing circuitry is further to reduce the content retention priority in response to a determination that the content popularity value is less than a priority threshold value, compare the content retention priority to a retention threshold value, and in response to a determination to a determination that the content retention priority is less than the retention threshold value, remove the content from the memory.

Example 28 may include a method performed by a component of an information centric network (ICN), the method comprising receiving a request for content stored in an extended content store of the component, the extended content store including the content and first attributes of the content, the first attributes including a content popularity value that indicates a number of requests for the content, transmitting a content packet including the content, and incrementing the popularity value in response to transmission of the content packet.

In Example 29, Example 28 may include, wherein the extended content store further includes a subset of the content and second attributes of the subset of the content stored thereon, the second attributes include a subset popularity value that indicates a number of requests for the subset of the content.

In Example 30, Example 29 may include, incrementing the subset popularity value and increment the content popularity value in response to transmitting a second content packet that includes the subset of the content.

In Example 31, at least one of Examples 29-30 may include incrementing the subset popularity value and refraining from incrementing the content popularity value in response to responding to the interest packet with a second content packet that includes the subset of the content.

In Example 32, at least one of Examples 28-31 may include issuing a request for a third popularity value from another component that includes the content or the subset of the content, receiving a third content packet in response to the issued request, the third content packet including an indication of the third popularity value, and adding the third popularity value to the content popularity value.

In Example 33, at least one of Examples 28-32 may include issuing a request for a third popularity value from another component that includes the content or the subset of the content, receiving a fourth content packet in response to the issued request, the fourth content packet including an indication of the third popularity value, and adding the third popularity value to the subset popularity value.

In Example 34, Example 33 may include, wherein the request for the third popularity value is issued to ICN search circuitry implemented at a higher layer of the ICN than the layer on which the content resides.

In Example 35, Example 34 may include, wherein the request is an interest packet with a content name field that indicates the content name.

In Example 36, at least one of Examples 34-35 may include managing the content based on the content popularity value and the subset popularity value.

In Example 37, Example 36 may include, wherein the attributes include a content retention priority corresponding to the content and a subset retention priority corresponding to the subset.

In Example 38, Example 37 may include reducing the content retention priority in response to a determination that the content popularity value is less than a priority threshold value.

In Example 39, Example 38 may include comparing the content retention priority to a retention threshold value, and in response to a determination to a determination that the content retention priority is less than the retention threshold value, removing the content from the extended content store.

In Example 40, Example 39 may include, wherein removal of the content from the extended content store occurs further in response to a determination that the content retention priority value is less than the subset retention priority value.

Example 41 may include a method performed by a component of an information centric network (ICN), the method comprising issuing a request for an identification of a component that provides a service not provided by the child components or the component as determined by an extended forwarding information base (FIB) of the component, the extended FIB including attributes of child components of the component, the attributes including one or more services provided by the child components, receiving a content packet in response to the issued request, the content packet including the identification of the component that provides the service, and forwarding the content to the component associated with the identification.

In Example 42, Example 41 may include, wherein the request for the identification is issued to ICN search circuitry implemented at a higher layer of the ICN than the layer on which the content resides.

In Example 43, at least one of Examples 41-42 may include adding the component, the identification, and the service to the extended FIB in response to receiving the content packet.

In Example 44, at least one of Examples 41-43 may include, wherein the request is an interest packet with a content name field that indicates the service requested.

In Example 45, at least one of Examples 41-44 may include, wherein the content is stored in an extended content store that includes the content, and first attributes of the content, the first attributes including a content popularity value that indicates a number of requests for the content, and the method further comprises incrementing the popularity value in response to a transmission of a content packet that includes the content, the content packet transmitted in response to an interest packet.

In Example 46, Example 45 may include, wherein the component includes an extended content store that includes a subset of the content and second attributes of the subset of the content stored thereon, the second attributes include a subset popularity value that indicates a number of requests for the subset of the content.

In Example 47, Example 46 may include incrementing the subset popularity value and increment the content popularity value in response to responding to an interest packet with a content packet that includes the subset of the content.

In Example 48, at least one of Examples 46-47 may include incrementing the subset popularity value and refrain from incrementing the content popularity value in response to responding to an interest packet with a content packet that includes the subset of the content.

In Example 49, at least one of Examples 45-48 may include issuing a request for a third popularity value from another component that includes the content or the subset of the content, receiving a second content packet in response to the issued request, the second content packet including an indication of the third popularity value, and adding the third popularity value to the content popularity value.

In Example 50, at least one of Examples 45-49 may include issuing a request for a third popularity value from another component that includes the content or the subset of the content, receiving a third content packet in response to the issued request, the third content packet including an indication of the third popularity value, and adding the third popularity value to the subset popularity value.

In Example 51, Example 50 may include, wherein the request for the other popularity value is issued to ICN search circuitry implemented at a higher layer of the ICN than the layer on which the content resides.

In Example 52, Example 51 may include managing the content based on the content popularity value and the subset popularity value.

In Example 53, Example 52 may include, wherein the attributes include a content retention priority corresponding to the content and a subset retention priority corresponding to the subset.

In Example 54, Example 53 may include reducing the content retention priority in response to a determination that the content popularity value is less than a priority threshold value, comparing the content retention priority to a retention threshold value, and in response to a determination to a determination that the content retention priority is less than the retention threshold value, removing the content from the extended content store.

Example 55 can include at least one machine readable medium including instructions that, when executed by processing circuitry of a component of an information centric network (ICN), cause the processing circuitry to perform operations comprising receiving a request for content stored in an extended content store of the component, the extended content store including the content and first attributes of the content, the first attributes including a content popularity value that indicates a number of requests for the content, transmitting a content packet including the content, and incrementing the popularity value in response to transmission of the content packet.

In Example 56, Example 55 may include, wherein the extended content store further includes a subset of the content and second attributes of the subset of the content stored thereon, the second attributes include a subset popularity value that indicates a number of requests for the subset of the content.

In Example 57, Example 56 may include, the operations further comprising incrementing the subset popularity value and increment the content popularity value in response to transmitting a second content packet that includes the subset of the content.

In Example 58, at least one of Examples 56-57 may include, the operations further comprising incrementing the subset popularity value and refraining from incrementing the content popularity value in response to responding to the interest packet with a third content packet that includes the subset of the content.

In Example 59, at least one of Examples 55-58 may include, the operations further comprising issuing a request for a third popularity value from another component that includes the content or the subset of the content, receiving a fourth content packet in response to the issued request, the fourth content packet including an indication of the third popularity value, and adding the third popularity value to the content popularity value.

In Example 60, at least one of Examples 55-59 may include, the operations further comprising issuing a request for a third popularity value from another component that includes the content or the subset of the content, receiving a fifth content packet in response to the issued request, the fifth content packet including an indication of the third popularity value, and adding the third popularity value to the subset popularity value.

In Example 61, Example 60 may include, wherein the request for the third popularity value is issued to ICN search circuitry implemented at a higher layer of the ICN than the layer on which the content resides.

In Example 62, Example 61 may include, wherein the request is an interest packet with a content name field that indicates the content name.

In Example 63, at least one of Examples 61-62 may include, the operations further comprising managing the content based on the content popularity value and the subset popularity value.

In Example 64, Example 63 may include, wherein the first attributes include a content retention priority corresponding to the content and the second attributes include a subset retention priority corresponding to the subset.

In Example 65, Example 64 may include, the operations further comprising reducing the content retention priority in response to a determination that the content popularity value is less than a priority threshold value.

In Example 66, Example 65 may include, the operations further comprising comparing the content retention priority to a retention threshold value, and in response to a determination to a determination that the content retention priority is less than the retention threshold value, removing the content from the extended content store.

In Example 67, Example 66 may include, wherein removal of the content from the extended content store occurs further in response to a determination that the content retention priority value is less than the subset retention priority value.

Example 68 may include at least one machine readable medium including instructions that, when executed by processing circuitry of a component of an information centric network (ICN), cause the processing circuitry to perform operations comprising issuing a request for an identification of a component that provides a service not provided by the child components or the component as determined by an extended forwarding information base (FIB) of the component, the extended FIB including attributes of child components of the component, the attributes including one or more services provided by the child components, receiving a content packet in response to the issued request, the content packet including the identification of the component that provides the service, and forwarding the content to the component associated with the identification.

In Example 69, Example 68 may include, wherein the request for the identification is issued to ICN search circuitry implemented at a higher layer of the ICN than the layer on which the content resides.

In Example 70, at least one of Examples 68-69 may include adding the component, the identification, and the service to the extended FIB in response to receiving the content packet.

In Example 71, at least one of Examples 68-70 may include, wherein the request is an interest packet with a content name field that indicates the service requested.

In Example 72, at least one of Examples 68-71 may include, wherein the request is an interest packet, and wherein the content is stored in an extended content store that includes the content, and first attributes of the content, the first attributes including a content popularity value that indicates a number of requests for the content, and the operations further comprising incrementing the popularity value in response to a transmission of a second content packet that includes the content, the second content packet transmitted in response to an interest packet.

In Example 73, Example 72 may include, wherein the component includes an extended content store that includes a subset of the content and second attributes of the subset of the content stored thereon, the second attributes include a subset popularity value that indicates a number of requests for the subset of the content.

In Example 74, Example 73 may include, the operations further comprising incrementing the subset popularity value and incrementing the content popularity value in response to responding to the interest packet with a third content packet that includes the subset of the content.

In Example 75, at least one of Examples 73-74 may include, the operations further comprising incrementing the subset popularity value and refrain from incrementing the content popularity value in response to responding to the interest packet with a content packet that includes the subset of the content.

In Example 76, at least one of Examples 72-75 may include, the operations further comprising issuing a request for a third popularity value from another component that includes the content or the subset of the content, receiving a fourth content packet in response to the issued request, the fourth content packet including an indication of the third popularity value, and adding the third popularity value to the content popularity value.

In Example 77, at least one of Examples 72-76 may include, the operations further comprising issuing a request for a third popularity value from another component that includes the content or the subset of the content, receiving a fifth content packet in response to the issued request, the fifth content packet including an indication of the third popularity value, and adding the third popularity value to the subset popularity value.

In Example 78, Example 77 may include, wherein the request for the other popularity value is issued to ICN search circuitry implemented at a higher layer of the ICN than the layer on which the content resides.

In Example 79, Example 78 may include, the operations further comprising managing the content based on the content popularity value and the subset popularity value.

In Example 80, Example 79 may include, wherein the attributes include a content retention priority corresponding to the content and a subset retention priority corresponding to the subset.

In Example 81, Example 80 may include, the operations further comprising reducing the content retention priority in response to a determination that the content popularity value is less than a priority threshold value, comparing the content retention priority to a retention threshold value, and in response to a determination to a determination that the content retention priority is less than the retention threshold value, removing the content from the extended content store.

Example 82 may include a system of a component of an information centric network (ICN), the system comprising means for storing an extended content store that includes content from at least one other component of the ICN, and first attributes of the content, the first attributes including a content popularity value that indicates a number of requests for the content, and means for incrementing the popularity value in response to a transmission of a content packet that includes the content, the content packet transmitted in response to receiving an interest packet.

In Example 83, Example 82 may include, wherein the means for storing the extended content store further includes means for storing a subset of the content and second attributes of the subset of the content stored thereon, the second attributes include a subset popularity value that indicates a number of requests for the subset of the content.

In Example 84, Example 83 may include incrementing the subset popularity value and incrementing the content popularity value in response to responding to the interest packet with a second content packet that includes the subset of the content.

In Example 85, at least one of Examples 83-84 may include means for incrementing the subset popularity value and refrain from incrementing the content popularity value in response to responding to the interest packet with a third content packet that includes the subset of the content.

In Example 86, at least one of Examples 82-85 may include means for issuing a request for a third popularity value from another component that includes the content or the subset of the content, receiving a fourth content packet in response to the issued request, the fourth content packet including an indication of the third popularity value, and adding the third popularity value to the content popularity value.

In Example 87, at least one of Examples 82-86 may include means for: issuing a request for a third popularity value from another component that includes the content or the subset of the content, receiving a fifth content packet in response to the issued request, the fifth content packet including an indication of the third popularity value, and adding the third popularity value to the subset popularity value.

In Example 88, at least one of Examples 86-87 may include, wherein the means for issuing request for the other popularity value is issued to ICN search circuitry implemented at a higher layer of the ICN than the layer on which the content resides.

In Example 89, at least one of Examples 87-88 may include, wherein the request is an interest packet with a content name field that indicates the content name.

In Example 90, at least one of Examples 87-89 may include means for managing the content based on the content popularity value and the subset popularity value.

In Example 91, Example 90 may include, wherein the attributes include a content retention priority corresponding to the content and a subset retention priority corresponding to the subset.

In Example 92, Example 91 may include means for reducing the content retention priority in response to a determination that the content popularity value is less than a priority threshold value.

In Example 93, Example 92 may include means for comparing the content retention priority to a retention threshold value, and in response to a determination to a determination that the content retention priority is less than the retention threshold value, removing the content from the memory.

In Example 94, Example 93 may include, wherein removal of the content from the memory occurs further in response to a determination that the content retention priority value is less than the subset retention priority value.

Example 95 may include a system of a component of an information centric network (ICN), the system comprising means for storing content and an extended forward information base (FIB), the extended FIB including first attributes of child components of the component, the attributes including one or more services provided by the child components, and means for issuing a request for an identification of a component that provides a service not provided by the child components or the component as determined by the FIB, receiving a content packet in response to the issued request, the content packet including the identification of the component that provides the service, and forwarding the content to the component associated with the identification.

In Example 96, Example 95 may include, wherein the request for the identification is issued to ICN search circuitry implemented at a higher layer of the ICN than the layer on which the content resides.

In Example 97, at least one of Examples 95-96 may include adding the component, the identification, and the service to the extended FIB in response to receiving the content packet.

In Example 98, at least one of Examples 95-97 may include, wherein the request is an interest packet with a content name field that indicates the service requested.

In Example 99, at least one of Examples 95-98 may include means for storing the content, and second attributes of the content, the second attributes including a content popularity value that indicates a number of requests for the content, and further comprising means for incrementing the popularity value in response to a transmission of a content packet that includes the content, the content packet transmitted in response to an interest packet.

In Example 100, Example 99 may include means for storing a subset of the content and second attributes of the subset of the content stored thereon, the second attributes include a subset popularity value that indicates a number of requests for the subset of the content.

In Example 101, Example 100 may include means for incrementing the subset popularity value and increment the content popularity value in response to responding to the interest packet with a second content packet that includes the subset of the content.

In Example 102, at least one of Examples 100-101 may include means for incrementing the subset popularity value and refrain from incrementing the content popularity value in response to responding to the interest packet with a third content packet that includes the subset of the content.

In Example 103, at least one of Examples 99-102 may include means for issuing a request for a third popularity value from another component that includes the content or the subset of the content, receiving a fourth content packet in response to the issued request, the fourth content packet including an indication of the third popularity value, and adding the third popularity value to the content popularity value.

In Example 104, at least one of Examples 99-103 may include means for issuing a request for a third popularity value from another component that includes the content or the subset of the content, receiving a fifth content packet in response to the issued request, the fifth content packet including an indication of the third popularity value, and adding the third popularity value to the subset popularity value.

In Example 105, Example 104 may include, wherein the request for the other popularity value is issued to ICN search circuitry implemented at a higher layer of the ICN than the layer on which the content resides.

In Example 106, Example 105 may include means for managing the content based on the content popularity value and the subset popularity value.

In Example 107, Example 106 may include, wherein the first attributes include a content retention priority corresponding to the content and the second attributes include a subset retention priority corresponding to the subset.

In Example 108, Example 107 may include means for reducing the content retention priority in response to a determination that the content popularity value is less than a priority threshold value, comparing the content retention priority to a retention threshold value, and in response to a determination to a determination that the content retention priority is less than the retention threshold value, removing the content from the memory.

Each of these non-limiting examples may stand on its own, or may be combined in various permutations or combinations with one or more of the other examples. Non-transitory merely means that the medium is a tangible media.

The above detailed description includes references to the accompanying drawings, which form a part of the detailed description. The drawings show, by way of illustration, specific embodiments in which methods, apparatuses, and systems discussed herein may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A component of an information centric network (ICN), the component comprising:
   a memory including an extended content store that includes:
   content from at least one other component of the ICN; and
   first attributes of the content, the first attributes including a content popularity value that indicates a number of requests for the content; and
   processing circuitry to:
   increment the content popularity value in response to a transmission of a first content packet that includes the content, the first content packet transmitted in response to receiving an interest packet.

2. The component of claim 1, wherein the memory further includes a subset of the content and second attributes of the subset of the content stored thereon, the second attributes including a subset popularity value that indicates a number of requests for the subset of the content.

3. The component of claim 2, wherein the processing circuitry is further to:
   increment the subset popularity value and increment the content popularity value in response to responding to the interest packet with a second content packet that includes the subset of the content.

4. The component of claim 2, wherein the processing circuitry is further to:
   increment the subset popularity value and refrain from incrementing the content popularity value in response to responding to the interest packet with a second content packet that includes the subset of the content.

5. The component of claim 1, wherein the processing circuitry is further to:
   issue a request for a third popularity value from another component that includes the content or the subset of the content;
   receive a third content packet in response to the issued request, the content packet including an indication of the third popularity value; and
   add the third popularity value to the content popularity value.

6. The component of claim 1; wherein the processing circuitry is further to:
   issue a request for a third popularity value from another component that includes the content or the subset of the content;
   receive a content packet in response to the issued request, the content packet including an indication of the third popularity value; and
   add the third popularity value to the subset popularity value.

7. The component of claim 5, wherein the request for the third popularity value is issued to ICN search circuitry implemented at a higher layer of the ICN than a layer on which the content resides.

8. The component of claim 6, wherein the request is a second interest packet with a content name field that indicates a content name.

9. The component of claim 2, wherein the processing circuitry is further to:
   manage the content based on the content popularity value and the subset popularity value.

10. The component of claim 9, wherein the first attributes include a content retention priority corresponding to the content and the second attributes include a subset retention priority corresponding to the subset.

11. The component of claim 10, wherein the processing circuitry is further to:
    reduce the content retention priority in response to a determination that the content popularity value is less than a priority threshold value.

12. The component of claim 11, wherein the processing circuitry is further to:
    compare the content retention priority to a retention threshold value; and in response to a determination to a determination that the content retention priority is less than the retention threshold value, remove the content from the memory.

13. The component of claim 12, wherein removal of the content from the memory occurs further in response to a determination that the content retention priority is less than the subset retention priority.

14. A component of a plurality of components of an information centric network (ICN), the component comprising:
 a memory including:
  content and an extended forward information base (FIB), the extended FIB including attributes of child components of the component, the attributes including one or more services provided by the child components; and
 processing circuitry to:
  issue a request for an identification of a second component that provides a service not provided by the child components or the component as determined by the FIB;
  receive a content packet in response to the issued request, the content packet including the identification of the second component that provides the service; and
  forward the content to the second component associated with the identification.

15. The component of claim 14, wherein the request for the identification is issued to ICN search circuitry implemented at a higher layer of the ICN than a layer on which the content resides.

16. The component of claim 14, wherein the processing circuitry is further to:
 add the second component, the identification, and the service to the extended FIB in response to receiving the content packet.

17. The component of claim 14, wherein the request is an interest packet with a content name field that indicates the service requested.

18. At least one non-transitory machine-readable medium including instructions that, when executed by processing circuitry of a component of an information centric network (ICN), cause the processing circuitry to perform operations comprising:
 receiving a request for content stored in an extended content store of the component, the extended content store including the content and first attributes of the content, the first attributes including a content popularity value that indicates a number of requests for the content;
 transmitting a content packet including the content; and
 incrementing the popularity value in response to transmission of the content packet.

19. The at least one non-transitory machine-readable medium of claim 18, wherein the extended content store further includes a subset of the content and second attributes of the subset of the content stored thereon, the second attributes include a subset popularity value that indicates a number of requests for the subset of the content.

20. The at least one non-transitory machine-readable medium of claim 19, the operations further comprising:
 incrementing the subset popularity value and increment the content popularity value in response to transmitting a second content packet that includes the subset of the content.

21. The at least one non-transitory machine-readable medium of claim 19, the operations further comprising:
 incrementing the subset popularity value and refraining from incrementing the content popularity value in response to responding to the interest packet with a third content packet that includes the subset of the content.

22. At least one non-transitory machine-readable medium including instructions that, when executed by processing circuitry of a component of an information centric network (ICN), cause the processing circuitry to perform operations comprising:
 issuing a request for an identification of a component that provides a service not provided by the child components or the component as determined by an extended forwarding information base (FIB) of the component, the extended FIB including attributes of child components of the component, the attributes including one or more services provided by the child components;
 receiving a content packet in response to the issued request, the content packet including the identification of the component that provides the service; and
 forwarding the content to the component associated with the identification.

23. The at least one non-transitory machine-readable medium of claim 22, wherein the request for the identification is issued to ICN search circuitry implemented at a higher layer of the ICN than the layer on which the content resides.

24. The at least one non-transitory machine-readable medium of claim 22, the operations further comprising:
 adding the component, the identification, and the service to the extended FIB in response to receiving the content packet.

25. The at least one non-transitory machine-readable medium of claim 22, wherein the request is an interest packet with a content name field that indicates the service requested.

* * * * *

UNITED STATES PATENT AND TRADEMARK OFFICE
CERTIFICATE OF CORRECTION

PATENT NO. : 10,356,197 B2  
APPLICATION NO. : 15/414036  
DATED : July 16, 2019  
INVENTOR(S) : Somayazulu et al.

Page 1 of 1

It is certified that error appears in the above-identified patent and that said Letters Patent is hereby corrected as shown below:

In the Claims

In Column 44, Line 34, in Claim 6, delete "claim 1;" and insert --claim 1,-- therefor Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*